US012539349B2

(12) United States Patent
Mizrahi et al.

(10) Patent No.: US 12,539,349 B2
(45) Date of Patent: Feb. 3, 2026

(54) BIOCOMPATIBLE TISSUE-ADHESIVE POLYMERS

(71) Applicants: TECHNION RESEARCH & DEVELOPMENT FOUNDATION LIMITED, Haifa (IL); CHILDREN'S MEDICAL CENTER CORPORATION, Boston, MA (US)

(72) Inventors: Boaz Mizrahi, Haifa (IL); Alona Shagan, Haifa (IL); Dan Kohane, Newton, MA (US); Wei Zhang, Nashua, NH (US)

(73) Assignees: TECHNION RESEARCH & DEVELOPMENT FOUNDATION LIMITED, Haifa (IL); CHILDREN'S MEDICAL CENTER CORPORATION, Boston, MA (US)

( * ) Notice: Subject to any disclaimer, the term of this patent is extended or adjusted under 35 U.S.C. 154(b) by 878 days.

(21) Appl. No.: 17/429,681

(22) PCT Filed: Feb. 10, 2020

(86) PCT No.: PCT/IL2020/050159
§ 371 (c)(1),
(2) Date: Aug. 10, 2021

(87) PCT Pub. No.: WO2020/161725
PCT Pub. Date: Aug. 13, 2020

(65) Prior Publication Data
US 2022/0105235 A1 Apr. 7, 2022

Related U.S. Application Data

(60) Provisional application No. 62/803,521, filed on Feb. 10, 2019.

(51) Int. Cl.
*A61L 24/04* (2006.01)
*A61L 24/00* (2006.01)
(Continued)

(52) U.S. Cl.
CPC ......... *A61L 24/046* (2013.01); *A61L 24/0042* (2013.01); *C08G 63/08* (2013.01)

(58) Field of Classification Search
None
See application file for complete search history.

(56) References Cited

U.S. PATENT DOCUMENTS

| | | | |
|---|---|---|---|
| 2004/0219214 A1* | 11/2004 | Gravett | A61P 41/00 424/484 |
| 2012/0288530 A1* | 11/2012 | Bordoloi | A61P 9/14 514/21.2 |
| 2020/0261615 A1* | 8/2020 | Tooren | A61L 24/0042 |

FOREIGN PATENT DOCUMENTS

| | | |
|---|---|---|
| EP | 2411062 B1 | 8/2014 |
| EP | 3436089 B1 | 4/2020 |
| WO | WO-2019066657 A3 * | 4/2019 ......... A61L 24/0036 |

OTHER PUBLICATIONS

Sugane et al., "Self-healing 8-armed star-shaped E-caprolactone oligomers dually crosslinked by the Diels-Alder and urethanization reactions," Polymer, vol. 144 pp. 92-102, (2018). (Year: 2018).*
(Continued)

*Primary Examiner* — Ha S Nguyen
(74) *Attorney, Agent, or Firm* — The Roy Gross Law Firm, LLC; Roy D. Gross

(57) ABSTRACT

The present invention provides a branched biodegradable and biocompatible polymer (e.g. polycaprolactone) and use thereof in bioadhesion of at least one biological surface.

15 Claims, 17 Drawing Sheets

(51) Int. Cl.
    A61L 24/06      (2006.01)
    C08G 63/08      (2006.01)
    C08G 63/685     (2006.01)
    C08G 63/688     (2006.01)

(56) References Cited

OTHER PUBLICATIONS

Cohn D, Lando G. Tailoring lactide/caprolactone co-oligomers as tissue adhesives. Biomaterials. Dec. 2004;25(27):5875-84. doi: 10.1016/j.biomaterials.2004.01.040. PMID: 15172500.
Shagan, A., Zhang, W., Mehta, M., Levi, S., Kohane, D. S., Mizrahi, B., Hot Glue Gun Releasing Biocompatible Tissue Adhesive. Adv. Funct. Mater. 2020, 30, 1900998. https://doi.org/10.1002/adfm.201900998.
Zeng, Qingya, "End-capping Star-like Polycaprolactone with Different Functional Groups and the Interaction with Smooth Muscle Cells." Master's Thesis, University of Tennessee, 2017. https://trace.tennessee.edu/utk_gradthes/4791.
Place ES, George JH, Williams CK, Stevens MM. Synthetic polymer scaffolds for tissue engineering. Chem Soc Rev. Apr. 2009;38(4):1139-51. doi: 10.1039/b811392k. Epub Feb. 16, 2009. PMID: 19421585.
A. Shagan, T. Croitoru-Sadger, E. Corem-Salkmon, and B. Mizrahi. Near-Infrared Light Induced Phase Transition of Biodegradable Composites for On-Demand Healing and Drug Release. ACS Applied Materials & Interfaces 2018 10 (4), 4131-4139 DOI: 10.1021/acsami.7b17481.
Mizrahi B, Shankarappa SA, Hickey JM, Dohlman JC, Timko BP, Whitehead KA, Lee JJ, Langer R, Anderson DG, Kohane DS. A Stiff Injectable Biodegradable Elastomer. Adv Funct Mater. Mar. 25, 2013;23(12):1527-1533. doi: 10.1002/adfm.201202433. PMID: 23667350; PMCID: PMC3646576.
Shagan, A., Zhang, W., Mehta, M., Levi, S., Kohane, D. S., & Mizrahi, B. (2019). Hot Glue Gun Releasing Biocompatible Tissue Adhesive. Advanced Functional Materials, 1900998. doi:10.1002/adfm.201900998.
R. Kelmansky, A. Shagan, B. Rozenblit, R. Omar, M. Lufton, B. Mizrahi, In Situ Dual Cross-Linking of Neat Biogel with Controlled Mechanical and Delivery Properties, Molecular pharmaceutics 2017, 14, 3609.
Kelmansky R, McAlvin BJ, Nyska A, Dohlman JC, Chiang HH, Hashimoto M, Kohane DS, Mizrahi B. Strong tissue glue with tunable elasticity. Acta Biomater. Apr. 15, 2017;53:93-99. doi: 10.1016/j.actbio.2017.02.009. Epub Feb. 9, 2017. PMID: 28189813.
Mizrahi B, Stefanescu CF, Yang C, Lawlor MW, Ko D, Langer R, Kohane DS. Elasticity and safety of alkoxyethyl cyanoacrylate tissue adhesives. Acta Biomater. Aug. 2011;7(8):3150-7. doi: 10.1016/j.actbio.2011.04.022. Epub Apr. 29, 2011. Erratum in: Acta Biomater. Jan. 2012;8(1):458. PMID: 21569875; PMCID: PMC4059060.
Alinasab B, Haraldsson PO. Rapid Resorbable Sutures Are a Favourable Alternative to Non-resorbable Sutures in Closing Transcolumellar Incision in Rhinoplasty. Aesthetic Plast Surg. Aug. 2016;40(4):449-52. doi: 10.1007/s00266-016-0649-2. Epub Jun. 1, 2016. PMID: 27251749.
Van Haute C, Tailly T, Klockaerts K, Ringoir Y. Sutureless circumcision using 2-Octyl cyanoacrylate results in more rapid and less painful procedures with excellent cosmetic satisfaction. J Pediatr Urol. Jun. 2015;11(3):147.e1-5. doi: 10.1016/j.jpurol.2015.02.013. Epub Mar. 20, 2015. PMID: 25910797.
Annabi N, Tamayol A, Shin SR, Ghaemmaghami AM, Peppas NA, Khademhosseini A. Surgical Materials: Current Challenges and Nano-enabled Solutions. Nano Today. Oct. 1, 2014;9(5):574-589. doi: 10.1016/j.nantod.2014.09.006. PMID: 25530795; PMCID: PMC4266934.
Yagnatovsky M, Pham H, Rokito A, Jazrawi L, Strauss E. Type IV hypersensitivity reactions following Dermabond adhesive utilization in knee surgery: A Report of Three Cases. Phys Sportsmed.

May 2017;45(2):195-198. doi: 10.1080/00913847.2017.1283208. Epub Jan. 25, 2017. PMID: 28116947.
Lloris-Carsi JM, Ballester-Álvaro J, Barrios C, Zaragozá-Fernández C, Gómez-De la Cruz C, González-Cuartero C, Prieto-Moure B, Cejalvo-Lapeña D. Randomized clinical trial of a new cyanoacrylate flexible tissue adhesive (Adhflex) for repairing surgical wounds. Wound Repair Regen. May 2016;24(3):568-80. doi: 10.1111/wrr.12424. Epub May 11, 2016. PMID: 26899011.
Bouten, P. J. M., Zonjee, M., Bender, J., Yauw, S. T. K., van Goor, H., van Hest, J. C. M., & Hoogenboom, R. (2014). The chemistry of tissue adhesive materials. Progress in Polymer Science, 39(7), 1375-1405. doi:10.1016/j.progpolymsci.2014.02.001.
Mittal, V., Akhtar, T., & Matsko, N. (2015). Mechanical, Thermal, Rheological and Morphological Properties of Binary and Ternary Blends of PLA, TPS and PCL. Macromolecular Materials and Engineering, 300(4), 423-435. doi:10.1002/mame.201400332.
Foox, M., Raz-Pasteur, A., Berdicevsky, I., Krivoy, N., & Zilberman, M. (2014). In vitromicrobial inhibition, bonding strength, and cellular response to novel gelatin-alginate antibiotic-releasing soft tissue adhesives. Polymers for Advanced Technologies, 25(5), 516-524. doi:10.1002/pat.3278.
Li, C., Sajiki, T., Nakayama, Y., Fukui, M., & Matsuda, T. (2003). Novel visible-light-induced photocurable tissue adhesive composed of multiply styrene-derivatized gelatin and poly(ethylene glycol) diacrylate. Journal of Biomedical Materials Research, 66B(1), 439-446. doi:10.1002/jbm.b.10025.
Wang DA, Varghese S, Sharma B, Strehin I, Fermanian S, Gorham J, Fairbrother DH, Cascio B, Elisseeff JH. Multifunctional chondroitin sulphate for cartilage tissue-biomaterial integration. Nat Mater. May 2007;6(5):385-92. doi: 10.1038/nmat1890. Epub Apr. 15, 2007. PMID: 17435762; PMCID: PMC8128046.
Annabi N, Zhang YN, Assmann A, Sani ES, Cheng G, Lassaletta AD, Vegh A, Dehghani B, Ruiz-Esparza GU, Wang X, Gangadharan S, Weiss AS, Khademhosseini A. Engineering a highly elastic human protein-based sealant for surgical applications. Sci Transl Med. Oct. 4, 2017;9(410):eaai7466. doi: 10.1126/scitranslmed.aai7466. Erratum in: Sci Transl Med. Dec. 5, 2018;10(470): PMID: 28978753.
Lang N, Pereira MJ, Lee Y, Friehs I, Vasilyev NV, Feins EN, Ablasser K, O'Cearbhaill ED, Xu C, Fabozzo A, Padera R. Wasserman S, Freudenthal F, Ferreira LS, Langer R, Karp JM, del Nido PJ. A blood-resistant surgical glue for minimally invasive repair of vessels and heart defects. Sci Transl Med. Jan. 8, 2014;6(218):218ra6. doi: 10.1126/scitranslmed.3006557. PMID: 24401941; PMCID: PMC4157752.
Annabi N, Rana D, Shirzaei Sani E, Portillo-Lara R, Gifford JL, Fares MM, Mithieux SM, Weiss AS. Engineering a sprayable and elastic hydrogel adhesive with antimicrobial properties for wound healing. Biomaterials. Sep. 2017;139:229-243. doi: 10.1016/j.biomaterials.2017.05.011. Epub May 23, 2017. PMID: 28579065.
Y.-E. Yoon, B. G. Im, J.-s. Kim, J.-H. Jang, Multifunctional Self-Adhesive Fibrous Layered Matrix (FILM) for Tissue Glues and Therapeutic Carriers, Biomacromolecules 2017, 18, 1, 127-140, Publication Date:Dec. 5, 2016 https://doi.org/10.1021/acs.biomac.6b01413.
Stapleton LM, Steele AN, Wang H, Lopez Hernandez H, Yu AC, Paulsen MJ, Smith AAA, Roth GA, Thakore AD, Lucian HJ, Totherow KP, Baker SW, Tada Y, Farry JM, Eskandari A, Hironaka CE, Jaatinen KJ, Williams KM, Bergamasco H, Marschel C, Chadwick B, Grady F, Ma M, Appel EA, Woo YJ. Use of a supramolecular polymeric hydrogel as an effective post-operative pericardial adhesion barrier. Nat Biomed Eng. Aug. 2019;3(8):611-620. doi: 10.1038/s41551-019-0442-z. Epub Aug. 7, 2019. PMID: 31391596.
Dewhirst MW, Viglianti BL, Lora-Michiels M, Hoopes PJ, Hanson M. Thermal Dose Requirement for Tissue Effect: Experimental and Clinical Findings. Proc SPIE Int Soc Opt Eng. Jun. 2, 2003;4954:37. doi: 10.1117/12.476637. PMID: 25301982; PMCID: PMC4188373.
Artzi N, Shazly T, Baker AB, Bon A, Edelman ER. Aldehyde-amine chemistry enables modulated biosealants with issue-specific adhesion. Adv Mater. Sep. 4, 2009;21(32-33):3399-403. doi: 10.1002/adma.200900340. PMID: 20882504; PMCID: PMC3615669.
Nomori, H., Horio, H., Morinaga, S., & Suemasu, K. (1999). Gelatin-resorcinol-formaldehyde-glutaraldehyde glue for sealing pul-

(56) References Cited

OTHER PUBLICATIONS monary air leaks during thoracoscopic operation. The Annals of Thoracic Surgery, 67(1), 212-216. doi:10.1016/s0003-4975(98)01184-9.
Ferreira P, Pereira R, Coelho JF, Silva AF, Gil MH. Modification of the biopolymer castor oil with free isocyanate groups to be applied as bioadhesive. Int J Biol Macromol. Jan. 30, 2007;40(2):144-52. doi: 10.1016/j.jbiomac.2006.06.023. Epub Jul. 5, 2006. PMID: 16893565.
Thirupathi Kumara Raja S, Thiruselvi T, Sailakshmi G, Ganesh S, Gnanamani A. Rejoining of cut wounds by engineered gelatin-keratin glue. Biochim Biophys Acta. Aug. 2013;1830(8):4030-9. doi: 10.1016/j.bbagen.2013.04.009. Epub Apr. 11, 2013. Erratum in: Biochim Biophys Acta. Oct. 2013;1830(10):4898. PMID: 23583368.
Strehin I, Nahas Z, Arora K, Nguyen T, Elisseeff J. A versatile pH sensitive chondroitin sulfate-PEG tissue adhesive and hydrogel. Biomaterials. Apr. 2010;31(10):2788-97. doi: 10.1016/j.biomaterials.2009.12.033. Epub Jan. 4, 2010. PMID: 20047758; PMCID: PMC3430123.
International Search Report of PCT/IL2020/050159 Completed May 17, 2020; Mailed May 20, 2020 4 pages.
International Search Report of PCT/IL2020/050159 Completed May 17, 2020; Mailed May 20, 2020 5 pages.

\* cited by examiner

BIOCOMPATIBLE TISSUE-ADHESIVE POLYMERS

CROSS REFERENCE TO RELATED APPLICATIONS

This application is a National Phase of PCT Patent Application No. PCT/IL2020/050159 having International filing date of Feb. 10, 2020, which claims the benefit of priority under 35 USC § 119(e) of U.S. Provisional Patent Application No. 62/803,521, filed Feb. 10, 2019, entitled "BIOCOMPATIBLE TISSUE-ADHESIVE POLYMER", the contents of which are incorporated herein by reference in their entirety.

FIELD OF INVENTION

The present invention is in the field of biocompatible polymers for tissue adhesion.

BACKGROUND OF THE INVENTION

Tissue bioadhesives have been studied for healthcare applications since ancient times, owing to their ability to close wound and promote healing. Compared to suture and staples, bioadhesives are easier to apply, they do not require removal and they usually lead to better cosmetic outcomes.

An ideal bioadhesive should be easy to apply, i.e. liquid around room temperatures, but quickly solidify after administration. The optimal melting point of the bio-adhesive must base on a trade-off between the clinical needs to be well above 37° C., and safety concerns, not to damage tissues and biologic molecules. It should also maintain both adhesion and cohesion strength, satisfactory elasticity, biodegradability and minimal toxicity. Since the elastic modulus of soft mammalian tissues ranges between 100 Pa for the softest tissues such as brain, to around 100 kPa for muscle, therefore mechanical properties of the potential biocompatible material must be optimized for any tissue type.

Currently available tissue adhesives have some inherent shortcomings, which limit their use in the clinic. Cyanoacrylate-based glues, for example, adhere very strongly to tissues, but are associated with severe inflammatory response and poor elasticity. Hydrogels, on the other hand, are considered safe, but lack the adhesion strength required for holding the tissue together. As a result, the use of cyanoacrylates is limited to external surfaces, while hydrogels such as fibrin glue serve as sealant-they seal the wound rather than hold it together. Therefore, new adhesion strategies that offer a viable alternative to suture and staples are much needed.

SUMMARY OF THE INVENTION

The present invention provides a biodegradable and biocompatible polymer and use thereof in bioadhesion of at least one biological surface.

In one aspect, there is provided a composition comprising a branched polymer comprising a plurality of biodegradable arms, wherein: at least one arm comprises a tissue-binding group; the melting point of the branched polymer is in the range from 37 to 70° C.; the adhesion strength of the branched polymer is more than 0.5N; the elastic modulus of the polymer is in the range from 10 to 200 kPa; and wherein the shear storage modulus of the polymer is in the range from 1 to 100 kPa, when measured at 37° C.

In one embodiment, the branched polymer comprises at least one terminating segment comprising the tissue-binding group.

In one embodiment, the branched polymer is selected from the group consisting of: star polymers, dendrimers, and hyperbranched polymers.

In one embodiment, the plurality of arms is two to ten arms.

In one embodiment, the plurality of arms is at least 4 arms.

In one embodiment, the biodegradable arm comprises a biodegradable polymer selected from the group consisting of: a polycaprolactone, poly-ε-caprolactone (PCL), a polyglycolide, a polylactide, poly-l-lactide (PLLA), poly-d,l-lactide (PLA), a polydioxanone, a polyhydroxybutyrate, a polyhydroxyvalerate, a polyethylglycol (PEG), a polyphosphoester, a polyurethane, a polyamino acid or any combination thereof.

In one embodiment, the biodegradable polymer is selected from the group consisting of PCL, PEG, and PLA or any combination thereof.

In one embodiment, the tissue-binding group is selected from the group consisting of: an activated ester, a carboxylic acid, an acyl halide, a chloroformate, an anhydride, an aldehyde, an epoxide, an isocyanate, an isothiocyanate, a maleimide, a carbonate, a sulfonyl chloride, a haloacetamide, an acyl azide, an imidoester, a carbodiimide, a vinyl sulfone, a thiol, ortho-pyridyl-disulfide, or any combination thereof.

In one embodiment, the tissue-binding group is selected from the group consisting of an activated ester, an aldehyde, an isocyanate, and a thiol or any combination thereof.

In one embodiment, the average molecular weight of the branched polymer ranges from 1,000 Da to 80,000 Da.

In one embodiment, the average molecular weight of the branched polymer ranges from 5,000 Da to 25,000 Da.

In one embodiment, the branched polymer comprises any of 4-8-armed PCL, 4-8-armed PEG-PLA, or both.

In one embodiment, the branched polymer is selected from the group consisting of 8-armed PCL-CHO, 8-armed PCL-NCO, 8-armed PCL-NHS, and 4-armed PEG-PLA-NHS or a combination thereof.

In one embodiment, the composition of the invention further comprises an additive.

In one embodiment, the composition is for use in bioadhesion of at least one biological surface.

In another aspect, there is provided a method for adhering or sealing a biological surface, comprising providing the composition of the invention under conditions suitable for melting the composition, and contacting the biological surface with the molten composition, thereby adhering or sealing the biological surface.

In one embodiment, the composition comprises a branched polymer selected from the group consisting of 8-armed PCL-CHO, 8-armed PCL-NCO, 8-armed PCL-NHS, and 4-armed PEG-PLA-NHS or a combination thereof.

In one embodiment, the method comprised providing the composition at a temperature of not more than 5° C. above the melting point of the composition.

In one embodiment, the method comprised contacting the composition with the biological surface at a temperature range from 37 to 70° C.

In another aspect, there is provided a kit, comprising: (i) the composition of any the invention; and (ii) a heating apparatus.

In one embodiment, the heating apparatus comprises a heating portion, further comprising an inlet opening to receive a solid composition, a heater for melting the solid composition, and an outlet opening for injecting the molten composition outside the apparatus.

In one embodiment, the heating apparatus provides the composition to a temperature of not more than 5° C. above the melting point of the composition.

In one embodiment, the heating apparatus further comprises a trigger for controlling the injection rate of the molten composition from the outlet opening.

In one embodiment, the composition comprises a branched polymer selected from the group consisting of 8-armed PCL-CHO, 8-armed PCL-NCO, 8-armed PCL-NHS, and 4-armed PEG-PLA-NHS or a combination thereof.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 3A shows changes in storage modulus (G') of the tested polymers under 60° C. or 37° C. FIG. 3B shows shear rate dependent viscosity of the tested polymers.

FIG. 4A shows an image of a skin sample loaded on the testing apparatus. The arrows indicate the area of adhesion. FIG. 4B is a graph showing maximum load at fracture of the tested polymers. FIG. 4C shows representative strain-stress curves of the tested polymers. FIG. 4D shows elastic modulus curves of the tested polymers. Data are means and SD of n=4, *=p-value <0.05, **=p-value <0.001

FIG. 5A shows NIH 3T3 cell viability, relatively to unexposed cells, evaluated by MTS assay, 24 h after exposure to 4-armed star PCL-NHS (left bar) and Dermabond® as a control (right bar). Data are means and SD of n=4. FIG. 5B shows microscope images of NIH 3T3 cells exposed to Dermabond®.

FIG. 6A. represents a histogram with hematoxylin-eosin stain showing inflammation in the subcutaneous skeletal muscle (black arrow) comprising of lymphocytes and macrophages (scale bar: 100 μm). Inset shows lymphocytes (blue arrow) and macrophages (red arrow) (scale bar: 50 μm). FIG. 6B represents a histogram with masson trichrome highlights the scarring (black arrow) at the incision site extending from the epidermis to the subcutaneous fat (scale bar: 200 μm). FIG. 6C represents a bar graph showing inflammatory response and scaring formation after 4 days. "a" represents a control, "b" represents Dermabond® and "c" represents the tested polymer. Data are means and SD of n=4, *=p-value <0.05. FIG. 6D represents a bar graph showing Inflammatory response and scaring formation after 14 days. "a" represents a control, "b" represents Dermabond® and "c" represents the tested polymer. Data are means and SD of n=4, *=p-value <0.05.

DETAILED DESCRIPTION OF THE INVENTION

Figure 1:
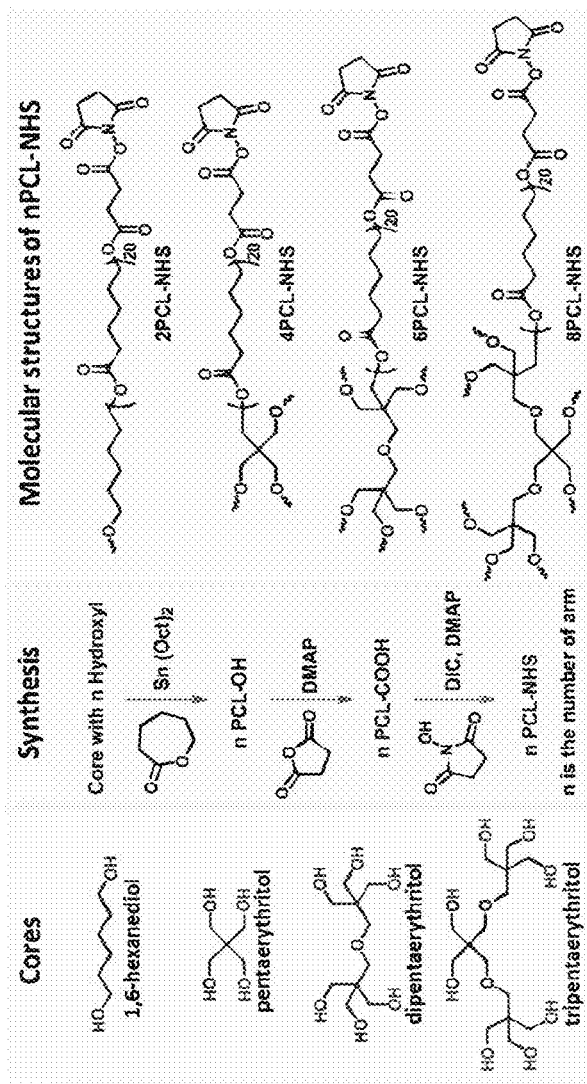
FIG. 1 represents a synthesis scheme of N-hydroxy succinimide substituted star-PolyCaproLactone (PCL). (Left) Structures of exemplary core units (Middle) Synthesis scheme of star-PCL: Synthesis of branched PCL; Substitution of OH terminal group with COOH by reaction with succinic anhydride; Substitution of COOH end group with N-hydroxy succinimide (NHS) group (Right) Molecular structures of 2-8 armed PCL-NHS.

The present invention is directed to a kit or a composition comprising a biodegradable and a biocompatible branched polymer and use thereof, such as for bioadhesion, in a subject in need thereof.

The present invention is based, in part, on the finding that a branched biodegradable and biocompatible polymer (e.g., polycaprolactone) with an average molecular weight ranging from 5,000 Da to 25,0000 Da, provides adequate elastic and adhesive properties (such as an elastic modulus being in a range from 10 to 200 kPa, and a shear storage modulus measured at 37° C. being in a range from 1 to 100 kPa) so as to be compatible with the biological tissue at the application site (such as a soft tissue). Furthermore, such a polymeric material having a low melting temperature (37-70° C.), does not require a carrier (e.g. diluent), and thus can be easily administered on the tissue upon melting.

Thus, the present invention provides a composition and a kit, comprising a biodegradable and biocompatible polymer (e.g., polycaprolactone (PCL)) with a low melting temperature, wherein the polymer is suitable for use in tissue adhesion and is tolerable by the tissue in contact therewith.

The present invention is also directed to a method for adhering or sealing biological surfaces (e.g. a tissue), comprising (i) providing the composition described herein under conditions suitable for melting the composition, and (ii) contacting the biological surface with the molten composition, thereby adhering or sealing the biological surface.

Branched Polymer

In one aspect of the invention, there is a composition comprising a polymer comprising a plurality of biodegradable arms. In some embodiments, the polymer is a branched polymer.

In some embodiments, the composition comprises a branched polymer comprising a plurality of biodegradable arms, wherein: at least one arm comprises a tissue-binding group; melting point of the branched polymer is in a range from 37 to 70° C.; adhesion strength of the branched polymer is more than 0.5N; elastic modulus of the polymer is in the range from 10 to 200 kPa; and wherein shear storage modulus of the polymer is in a range from 1 to 100 kPa, when measured at 37° C.

In some embodiments, the composition is devoid of a carrier.

In some embodiments, the branched polymer is selected from the group consisting of: star polymers, dendrimers, hyperbranched polymers.

In some embodiments, branched polymers may be used as bioadhesives of the compositions and methods described herein, based on the finding that branched (e.g. a star-shaped) polymers exhibit lower melting temperatures (Tm), as compared to linear polymers within the same composition. Furthermore, in contrast to the linear polymer, the Tm of the branched polymer can be adjusted by changing the average molecular weight of the polymer. Moreover, as compared to a linear polymer, a branched polymer, comprising a plurality of branches has a significantly higher load of end-groups (e.g. tissue-binding groups). Hence, branched bioadhesive polymers, comprising an elevated number of tissue-binding groups, may exhibit enhanced bioadhesive properties.

Figure 13:
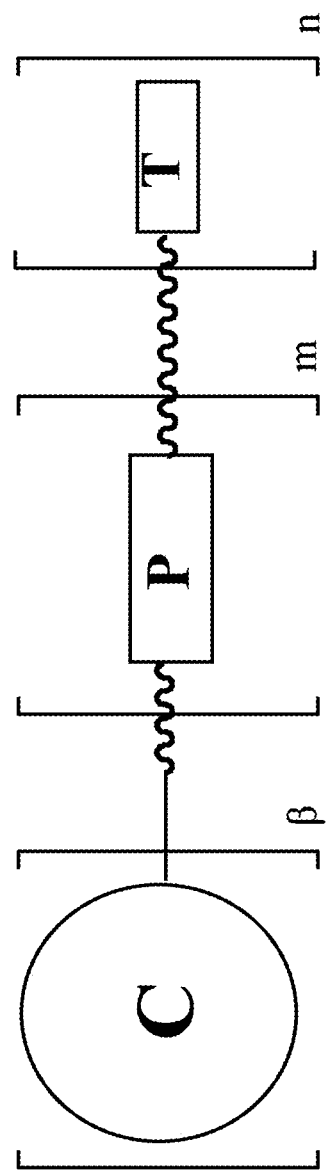
FIG. 13 is a scheme representing a schematic structure of a polymer of the invention.
Figure 14:
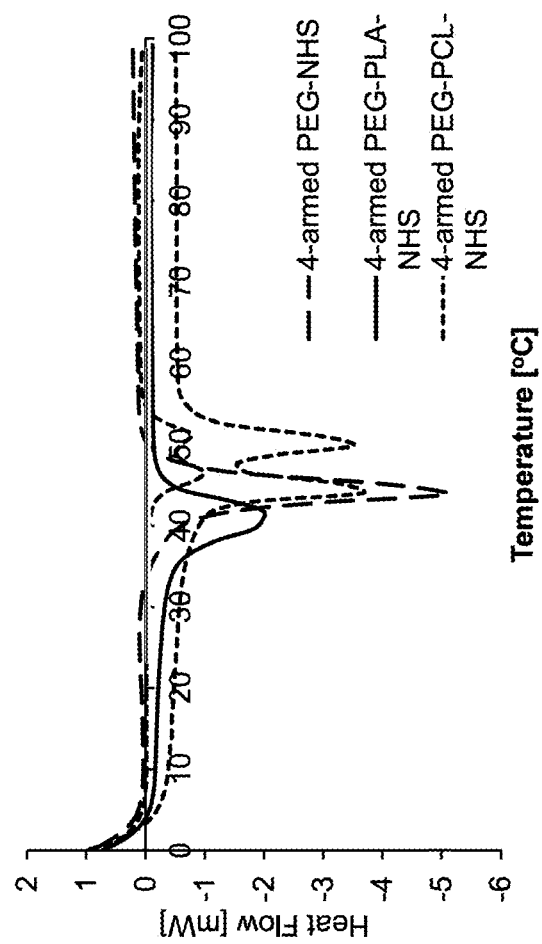
FIG. 14 is a graph showing a differential scanning calorimetry (DSC) of exemplary polymers.

According to some non-limiting embodiments, the polymer of the invention is represented by FIG. 13, wherein C is a branched core unit covalently linked to 13 branches, wherein any one of the branches independently comprises a polymeric segment P and a terminating segment T, wherein at least one terminating segment T comprises at least one tissue-binding group, wherein, 13 equals 2 to 10; m is at least 1; n is at least 1.

As used herein, the term "polymer" describes an organic substance composed of a plurality of repeating structural units (monomeric units) covalently connected to one another. The term "monomeric unit" refer to a repeat unit, derived from the corresponding monomer. Herein, the term "monomer" refers to a molecule that may react with other molecules, thereby forming a polymeric chain. The terms "polymer" and "polymeric chain" or "chain" are used herein interchangeably.

In some embodiments, the polymer of the invention is a star polymer, wherein the star polymer is as described hereinbelow.

In some embodiments, the branched polymer comprises one or more branched core units. In some embodiments, the branched polymer comprises at least two branched core units. In some embodiments, the branched polymer comprises at least three, branched core units.

In some embodiments, the branched polymer comprises a plurality of arms. In some embodiments, the branched polymer comprises 2-10 arms, 2-8 arms, 2-4 arms, 4-6 arms, 6-8 arms, including any range or value therebetween.

In some embodiments, the branched polymer has 2 arms. In some embodiments, the branched polymer has 3 arms. In some embodiments, the branched polymer has 5 arms. In some embodiments, the branched polymer has 6 arms. In some embodiments, the branched polymer has 7 arms. In some embodiments, the branched polymer has 8 arms. In some embodiments, the branched polymer has 10 arms.

In some embodiments, the branched polymer comprises at least 4 arms. In some embodiments, the branched polymer comprises at least 3 arms. In some embodiments, the branched polymer comprises at least 5 arms. In some embodiments, the branched polymer comprises at least 6 arms. In some embodiments, the branched polymer comprises at least 7 arms. In some embodiments, the branched polymer comprises at least 8 arms.

In some embodiments, the core unit comprises 2-8 arms, 2-4 arms, 4-6 arms, 6-8 arms, including any range or value therebetween.

In some embodiments, the core unit has 2 arms. In some embodiments, the core unit has 3 arms. In some embodiments, the core unit has 5 arms. In some embodiments, the core unit has 6 arms. In some embodiments, the core unit has 7 arms. In some embodiments, the core unit has 8 arms. In some embodiments, the core unit has 10 arms. In some embodiments, the core unit has 2-8 arms, 3-8 arms, 4-8 arms, 3-5 arms, 3-6 arms, 4-6 arms, 6-8 arms, 8-10 arms, including any range or value therebetween.

In some embodiments, the core unit comprises a plurality of terminal heteroatoms. In some embodiments, each branch of the core unit comprises a heteroatom. In some embodiments, the heteroatom is a nucleophile. In some embodiments, the heteroatom is capable of reacting with the monomer (e.g. via a nucleophilic or radical addition, nucleophilic or radical substitution reaction). In some embodiments, the heteroatom is capable of starting polymerization of monomers. In some embodiments, the heteroatom comprises any of oxygen, nitrogen, sulfur or a combination thereof.

In some embodiments, the core unit comprises any of

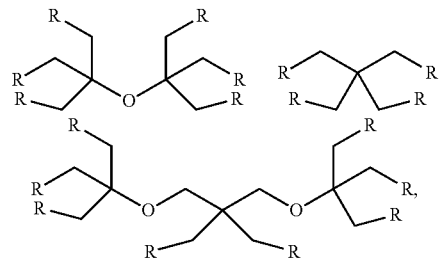

wherein each R is independently selected from OH, $NH_2$, and SH.

Non-limiting examples of branched core units include but are not limited to: C2-C18-diol (such as 1,5-pentanediol, 1,6-hexanediol, 1,4-propanediol), C2-C18-dithiol, C2-C18-diamine, or any combination thereof. Additional non-limiting examples of branched core units include but are not limited to: pentaerythritol, dipentaerythritol, tripentaerythritol, calyx[8]arene, including any combination or heteroatomic derivatives thereof.

In some embodiments, the core unit comprises any of pentaerythritol, dipentaerythritol, tripentaerythritol or any combination thereof. In some embodiments, the core unit is pentaerythritol. In some embodiments, the core unit is dipentaerythritol. In some embodiments, the core unit is tripentaerythritol.

In some embodiments, the core unit is covalently linked to one or more branches, wherein at least one branch comprises a polymeric segment. In some embodiments, the core unit is covalently linked to one or more branches, wherein any one of the branches independently comprises at least one polymeric segment, and at least one tissue-binding group. In some embodiments, a plurality of branches comprises the same polymer. In some embodiments, a plurality of branches comprises different polymers, wherein the polymer is as described hereinbelow.

In some embodiments, the core unit is covalently linked to two or more branches, wherein each one of the branches has the same chemical composition.

In some embodiments, the core unit is covalently linked to two or more branches, wherein each one of the branches has a different chemical composition.

A non-limiting example of a star polymer, comprising branches with a different composition is provided under formula II:

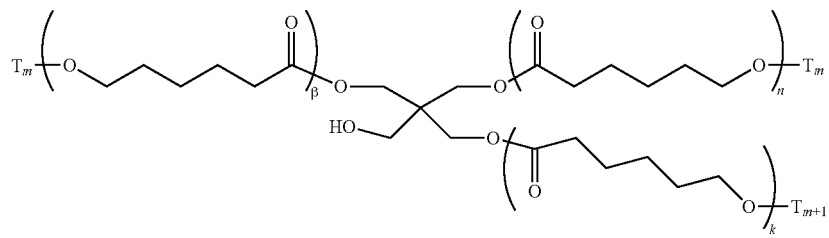

wherein:
n, k, and β are as described hereinabove, T is a terminating segment, comprising at least one tissue-binding group, and m is at least 1.

In some embodiments, the core unit is covalently linked to two or more branches, wherein some of the branches have a different chemical composition.

As used herein, the term "chemical composition" describes a composition matter of any one of the segments (e.g. a chemical structure and average number of monomers in a polymeric segment).

As used herein, the term "linked" comprises bound, such as via a covalent and/or a non-covalent bond. As used herein, the term "covalent bond" comprises a covalent bond (e.g. σ-σ-bond, π-π-bond or a combination thereof), a coordinative bond or both. In some embodiments, a covalent bond comprises a molecular orbital shared between a plurality of atoms. In some embodiments, shared molecular orbital comprises 1, 2, or 3 electrons.

As used herein, the term "polymeric segment" refers to a polymeric structure of any length. In the art of polymer technology, a long polymeric structure is often referred to as a block, whereas a short polymeric structure is often referred to as a segment. Both these conventional meanings are understood to be comprised in the term "segment" as used herein.

In some embodiments, the polymeric segment is a copolymer comprising a plurality of polymeric subunits. As used herein the polymeric subunits refers to a polymeric chain.

The copolymer is selected from the group consisting of: block-, alternating-, periodic-, and random-copolymers.

In some embodiments, the polymeric segment is a homopolymer.

In some embodiments, the polymeric segment comprises at least one biodegradable subunit. In some embodiments, the polymeric segment comprises at least one biocompatible subunit. In some embodiments, the polymeric segment comprises at least one biocompatible and biodegradable subunit. In some embodiments, the polymeric segment comprises at least one biodegradable subunit and at least one non-biodegradable subunit. In some embodiments, the polymeric segment is fully biodegradable. In some embodiments, the polymeric segment is fully biocompatible. In some embodiments, the polymeric segment is biodegradable and biocompatible.

In some embodiments, the polymer of the invention (such as a star polymer) comprises at least one biodegradable or biocompatible branch. In some embodiments, the polymer of the invention comprises at least one biodegradable or biocompatible polymeric segment.

In some embodiments, the polymeric segment comprises between 5 and 1,000, between 5 and 10, between 5 and 50, between 5 and 40, between 5 and 30, between 5 and 20, between 10 and 30, between 10 and 25, between 18 and 25, between 20 and 30, between 20 and 23, between 20 and 40, between 20 and 50, between 50 and 70, between 70 and 90, between 90 and 100, between 100 and 150, between 150 and 200, between 200 and 300, between 300 and 400, between 400 and 500, between 500 and 600, between 600 and 700, between 700 and 800, between 800 and 900, between 900 and 1,000 repeating units including any range or value therebetween.

In some embodiments, the number average molecular weight of polymeric segment is 80,000 Da or less, or 50,000 Da or less, or 20,000 Da or less, or 10,000 Da or less, or 5,000 Da or less, or 4,000 Da or less, or 3,000 Da or less, or 2,000 Da or less, or 1,000 Da or less, or 500 Da or less. In some embodiments, the number average molecular weight of the polymeric segment ranges from 500 Da to 10,000 Da. In some embodiments, the number average molecular weight of the polymer ranges from 500 to 1,000 Da, from 500 to 1,500 Da, from 1,000 to 2,500 Da, from 1,000 to 3,000 Da, from 1,500 to 2,500 Da, from 2,000 to 3,000 Da, from 1,500 to 2,000 Da, from 3,000 to 3,500 Da, from 3,000 to 4,000 Da, from 4,000 to 5,000 Da, from 5,000 to 6,000 Da, from 5,000 to 6,000 Da, from 6,000 to 7,000 Da, from 7,000 to 8,000 Da, from 8,000 to 9,000 Da, from 9,000 to 10,000 Da including any range or value therebetween.

As used herein, the term "biocompatible", is intended to describe materials that, are non-toxic to cells in vitro and upon administration in vivo, do not induce undesirable long-term effects.

As used herein, the terms "molecular weight" or "average molecular weight" refer to a number average molecular weight (Mn) The number average molecular weight (Mn)

measuring system requires counting the total number of molecules in a unit mass of polymer irrespective of their shape or size.

The Number Average Molecular Weight $M_n$ is Calculated as:

$$Mn=\Sigma_i N_i M_i / \Sigma_i N_i,$$

wherein $M_i$ is the molecular weight of a chain, $N_i$ is the number of chains of that molecular weight, and i is the number of polymer molecules.

As used herein, the term "biodegradable", is intended to describe materials comprising covalent bonds that are degraded in vivo, wherein the degradation of the covalent bond occurs via hydrolysis. The hydrolysis can involve a direct reaction with an aqueous medium or can be catalyzed chemically or enzymatically. "Aqueous medium" refers to water, aqueous solutions, physiological media or biological fluids (e.g., body fluids), and other pharmaceutically acceptable media. Suitable hydrolysable covalent bonds are selected from the group containing: esters, amides, urethanes, carbamates, carbonates, azo linkages, anhydrides, thioesters, and combinations thereof.

The non-limiting examples of biodegradable polymers include but are not limited to: polyethers (e.g., polyethyleneglycol (PEG), polyropyleneglycol), polycaprolactones, polyglycolides, polylactides (e.g., poly-l-lactide (PLLA), poly-d,l-lactide (PLA)), polydioxanones, polyhydroxybutyrate, polyhydroxyvalerate, polyphosphoesters, polyurethanes, polyamino acids or any combination or a copolymer thereof.

In some embodiments, the branched polymer of the invention is substantially biodegradable. As used herein, the term substantially comprises at least 60%, at least 70%, at least 80%, at least 85%, at least 90%, at least 92%, at least 95%, at least 97%, at least 98%, at least 99% by total mass of the polymer.

In some embodiments, at least one arm of the branched polymer is substantially biodegradable. In some embodiments, at least two arms of the branched polymer are substantially biodegradable. In some embodiments, the plurality of arms is biodegradable. In some embodiments, the polymeric segment of the branched polymer is substantially biodegradable. In some embodiments, the polymeric segment of the branched polymer is biodegradable.

In some embodiments, the branched polymer is devoid of a biodegradable core unit. In some embodiments, the branched polymer is devoid of a biodegradable terminating segment.

In some embodiments, the polymeric segment is devoid of PEG homopolymer. In some embodiments, the polymeric segment comprises PEG. In some embodiments, the polymeric segment comprises PEG and PCL. In some embodiments, the polymeric segment comprises PEG-PCL co-polymer. In some embodiments, the polymeric segment is a PEG-PCL co-polymer-based segment. In some embodiments, the polymeric segment is a PEG-PLA co-polymer-based segment. In some embodiments, the polymeric segment is a PCL based segment, wherein the PCL based segment may be a polycaprolactone homopolymer or may be a copolymer (e.g. comprising polycaprolactone-, polylactic acid-, and/or polyglycolic acid subunits).

In some embodiments, the polymeric segment is poly-ε-caprolactone homopolymer. In some embodiments, the polymeric segment is PEG-poly-ε-caprolactone copolymer.

Terminating Segment

In some embodiments, the polymeric segment is linked to one or more terminating segments, wherein the terminating segment comprises at least one tissue-binding group.

In some embodiments, the polymeric segment is linked to one or more terminating segments via a covalent bond.

In some embodiments, the terminating segment can be represented by the general formula III:

wherein
A is a covalent bond, L is a linking group and R is a tissue-binding group; b is 1 or more than 1, c is 1 or more than 1.

In some embodiments, the polymeric segment is linked to one or more terminating segments via a covalent bond.

Non-limiting examples of covalent bonds include but are not limited to: ester, amide, carbonate, anhydride, carbamate, carbamide and thioester.

Non-limiting examples of linking groups include but are not limited to: linear-, branched-, cyclic-alkyls, substituted alkyls, polymers (e.g. PEG), aryls, heterocycles, amino acids and peptides or any combination thereof. Additional linking groups are known in the art and disclosed in U.S. Pat. Nos. 6,613,807, and 6,685,928.

In some embodiments, at least a part of the terminating segments comprise a tissue-binding group. In some embodiments, any of the terminating segments comprise a tissue-binding group. In some embodiments, the terminating segment comprises one or more tissue-binding groups. In some embodiments, the terminating segment comprises one tissue-binding group. In some embodiments, any of the terminating segments comprises between 1 and 10, between 1 and 2, between 2 and 4, between 4 and 6, between 6 and 8, between 8 and 10 tissue-binding groups including any range or value there between.

In some embodiments, the branched polymer comprises at least two, at least three, at least four, at least five, at least six, at least seven, at least eight tissue-binding groups, wherein the tissue-binding groups are identical. In some embodiments, the branched polymer comprises a plurality of different tissue-binding groups.

In some embodiments, the terminating segment comprises one type of tissue-binding groups or more types of tissue-binding groups. The term "tissue-binding group" encompasses any chemical group or functionality that may interact with a biological surface (e.g. a tissue), resulting in a covalent or non-covalent bond formation. Biological surfaces, such as tissues generally consist of cells, comprising on their surface protein molecules, which commonly contain thiol and primary amine moieties. Many functional groups such as activated ester, may covalently bind to the biological surface by reacting with thiols or primary amines, which are located on the cell surface. In addition to forming covalent bonds, the tissue-binding groups may form non-covalent bonds with the biological surface. The term "non-covalent bonds" encompasses: ligand-receptor interactions, hydrogen bonding, dipole-dipole interactions and van der Waals bonds or any combination thereof. The use of tissue-binding groups in terms of present invention, provides bio-adhesive properties to the polymeric material.

As used herein, the term "activated ester" refer to an ester-derived group bearing a leaving group having a significantly better reactivity (i.e., leaving group ability) then an alkoxy group. The activated ester reacts at room temperature with nucleophiles such as amines and thiols, so as to form an amide group. Such activated esters are known in the art, including inter alia hydrobenzotriazole ester (formed by reacting a carboxy group with HOBt, HOAt etc), NHS-ester, imidazole anhydride (formed by reacting a carboxy group with carbonyldiimidazole), O-acyl ester (formed by reacting a carboxy group with a carbodiimide).

As used herein, the term "biological surface" refer to any surface comprising cells and/or biological molecules (e.g. proteins, polysaccharides, lipids, nucleic acids). Non-limiting examples of "biological surface" include, but are not limited to: tissue surface, synthetic graft surface, and organ surface.

Non-limiting examples of tissue-binding groups, which form non-covalent bonds with the biological surface, include, but are not limited to: amides, carboxylates and peptides (e.g. RGD).

Non-limiting examples of tissue-binding groups which form covalent bonds with the biological surface, include, but are not limited to: an activated ester (e.g. NHS), a carboxylic acid, an acyl halide, a chloroformate, an anhydride, an aldehyde, a benzaldehyde (CHO), an epoxide, an isocyanate (NCO), an isothiocyanate, a maleimide, a carbonate, a sulfonyl chloride, a haloacetamide, an acyl azide, an imidoester, a carbodiimide, a vinyl sulfone, a thiol (SH), a C1-C10 thioalkyl, an ortho-pyridyl-disulfide, or any combination thereof.

In some embodiments, the tissue-binding group comprises an activated ester. In some embodiments, the tissue-binding group comprises any of isocyanate (such as a carbamate derivative of hexamethylene diisocyanate), a thiol (such as an ester derivative of thiopropionic acid), a benzaldehyde (such as an ester derivative of 4-formylbenzoic acid) or a combination thereof.

In some embodiments, the tissue-binding group is N-hydroxysuccinimide (NHS) ester. The mechanism by which an NHS-functionalized polymer reacts with an amine-containing material, such as a tissue protein, is illustrated below.

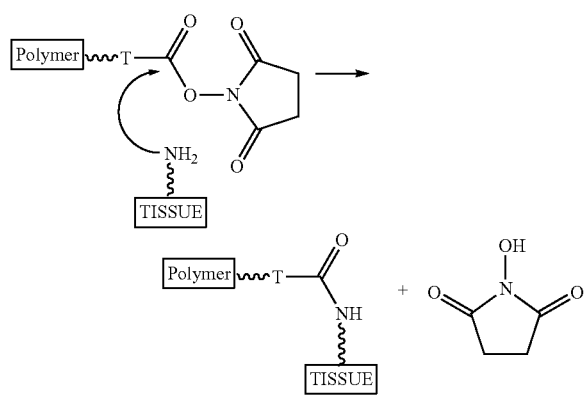

In some embodiments, the terminating segment is an NHS-esterified derivative of succinic acid.

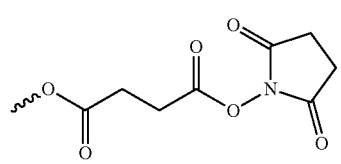

In some embodiments, the tissue-binding group can be introduced directly to a terminal group of the polymeric segment.

In some embodiments, the tissue-binding group can be introduced directly to a side chain of the polymeric segment.

As used herein, the term "introduced directly" encompasses a chemical modification, which converts a functional group of the polymeric segment (e.g. a nucleophile) into the tissue-binding group (e.g. an electrophile). For example, a terminal hydroxyl group of PCL can be converted into a chloroformate by a chemical modification, comprising a reaction of PCL with phosgene.

In some embodiments, the polymeric segment comprises one or more tissue-binding groups.

Figure 7:
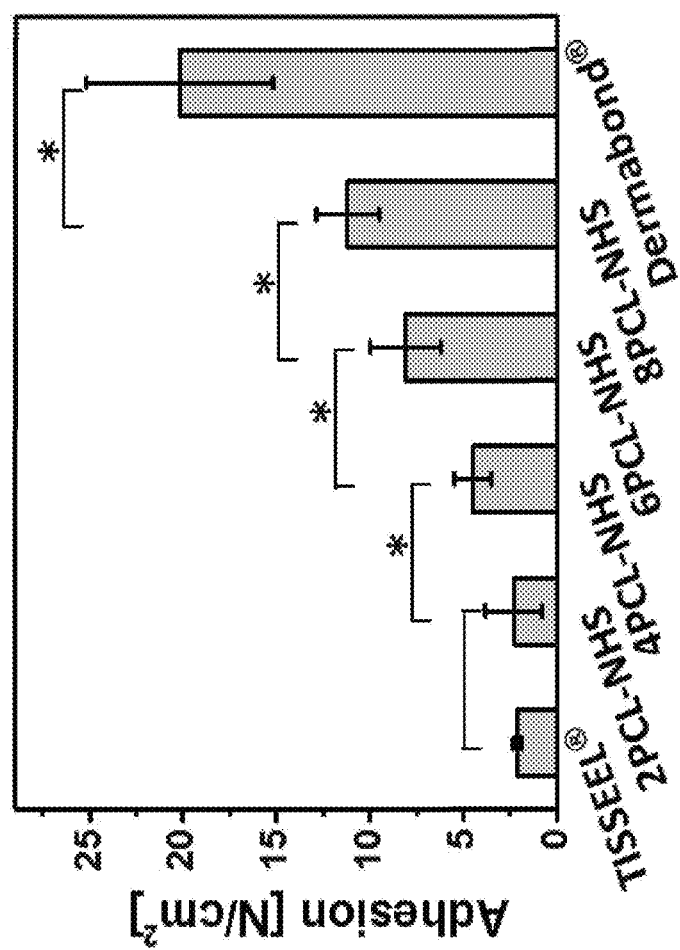
FIG. 7 is a bar graph representing adhesive strength of the test adhesives. Data are means, * indicates p<0.05.
Figure 9:
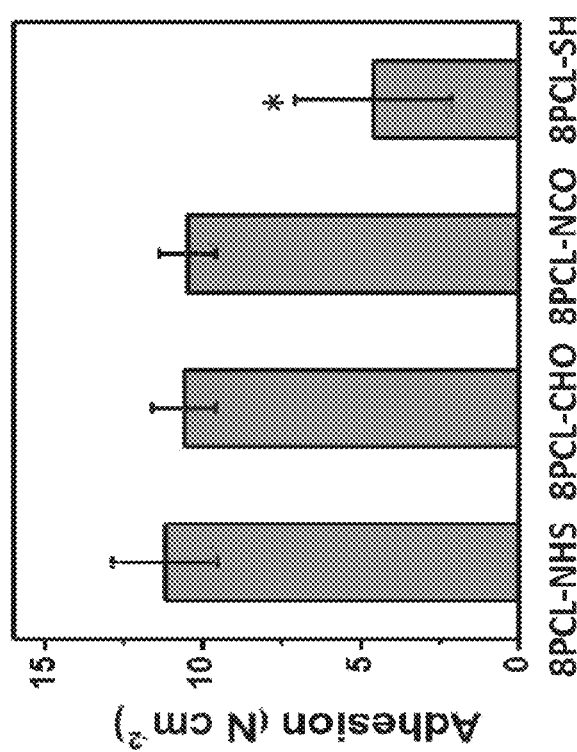
FIG. 9 is a bar graph representing adhesion strength of 8PCL-NHS, 8PCL-CHO, 8PCL-NCO and 8PCL-SH. Data are means; * indicates p<0.05 compared to 8PCL-NHS.

In some embodiments, tissue-binding groups provide bioadhesive properties to the polymer of the present invention (as exemplified by FIG. 7 and by FIG. 9 hereinbelow).

Figure 12:
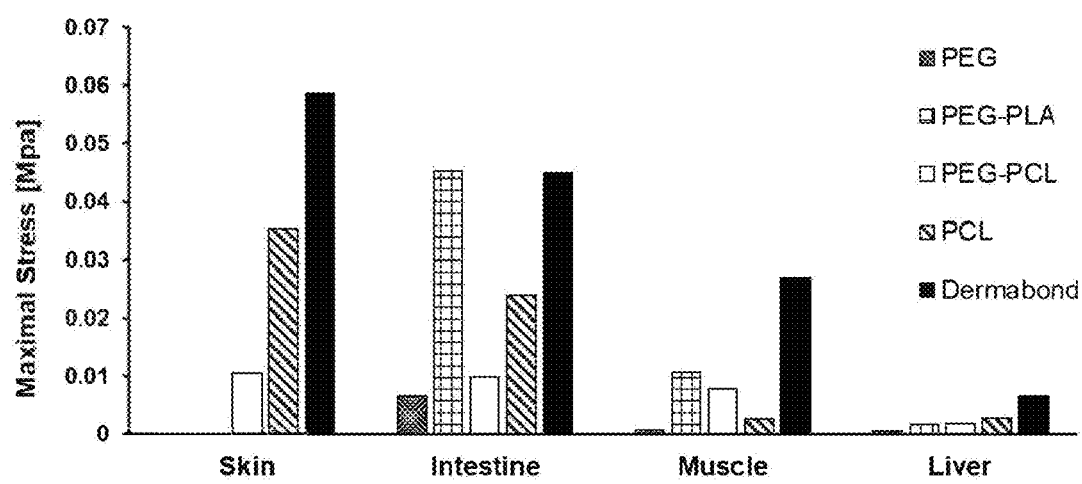
FIG. 12 is a bar graph representing adhesive strength of 4-armed polymers with different tissues. Data are means of n=4.

In some embodiments, the chemical structure of the polymer provides sufficient properties for bioadhesion (as exemplified by FIG. 12 hereinbelow).

In some embodiments, the polymeric segment comprises tissue-binding monomers, which form covalent and/or non-covalent bonds with the biological surface, resulting in bioadhesion.

In some embodiments, the bioadhesive properties of the polymer are based on non-covalent interactions such as dipol-dipol interactions and/or van der Waals bond formation. In addition to forming covalent bonds with the surface to which it is applied, the polymeric material may also have bioadhesive properties. By this is meant that the polymer should exhibit good initial adhesion to biological surface to which it is applied. Polymers with such properties typically contain chemical groups with a high ionic density, e.g. carboxyl, amide, lactam, hydroxyl, ether and ester groups, and the salts thereof, which interact non-covalently with tissues, through the formation of ionic and hydrogen bonds, dipole-dipole interactions and Van der Waals forces. For example, polymers, such as polyvinylpyrrolidone (PVP) derivatives, can provide such bioadhesive properties.

In some embodiments, bioadhesive properties of the polymer are based on self-adhesion. In some embodiments, a cohesive strength of the polymer is provided by self-adhesion. The term "self-adhesion" as used herein, refers to a tendency of polymeric chains to aggregate or cling to one another. The driving force for self-adhesion is mostly based on non-covalent interactions between the molecules of a polymeric material. In some embodiments, the self-adhesion is provided by solidification of the polymer. In some embodiments, the self-adhesive polymer solidifies at a temperature of human or animal body.

In some embodiments, the polymer of the invention further comprises a cross-linking agent. In some embodiments, one or more polymeric segments of the polymer are covalently crosslinked by a cross-linking agent. Cross-linking agents are well known in the art, comprising inter alia di-nucleophilic compounds.

In some embodiments, the branched polymer of the invention comprises any of 4-8-armed PCL, 4-8-armed PEG-PLA, or both.

In some embodiments, the star polymer of the invention comprises a 2-10-armed homopolymer comprising the tissue-binding group. In some embodiments, the star polymer of the invention comprises a 2-6-armed homopolymer comprising an active ester (such as NHS group) as a terminating segment. In some embodiments, the star polymer of the invention comprises a 6-10-armed homopolymer comprising an active ester (such as NHS group) as a terminating segment. In some embodiments, the star polymer of the invention comprises a 10-armed homopolymer comprising NHS group as a terminating segment. In some embodiments, the star polymer of the invention comprises a 8-armed homopolymer comprising NHS group as a terminating segment. In some embodiments, the star polymer of the invention comprises 8-armed PCL-X, wherein X is the tissue-binding group.

In some embodiments, the star polymer of the invention comprises a 2-6-armed homopolymer comprising an isocyanate group as a terminating segment. In some embodiments, the star polymer of the invention comprises a 6-10-armed homopolymer comprising an isocyanate group as a terminating segment. In some embodiments, the star polymer of the invention comprises a 8-armed homopolymer comprising an isocyanate group as a terminating segment. In some embodiments, the star polymer of the invention comprises 8-armed PCL-NCO (isocyanate), wherein PCL-NCO is as exemplified by FIG. 2.

In some embodiments, the star polymer of the invention comprises a 2-6-armed homopolymer comprising a thiol group as a terminating segment. In some embodiments, the star polymer of the invention comprises a 6-10-armed homopolymer comprising a thiol group as a terminating segment. In some embodiments, the star polymer of the invention comprises a 8-armed homopolymer comprising a thiol group as a terminating segment. In some embodiments, the star polymer of the invention comprises 8-armed PCL-SH, wherein PCL-SH is as exemplified by FIG. 2.

In some embodiments, the star polymer of the invention comprises a 2-6-armed homopolymer comprising an aldehyde group (e.g. benzaldehyde) as a terminating segment. In some embodiments, the star polymer of the invention comprises a 6-10-armed homopolymer comprising a benzaldehyde group as a terminating segment. In some embodiments, the star polymer of the invention comprises a 8-armed homopolymer comprising a benzaldehyde group as a terminating segment.

Figure 2:
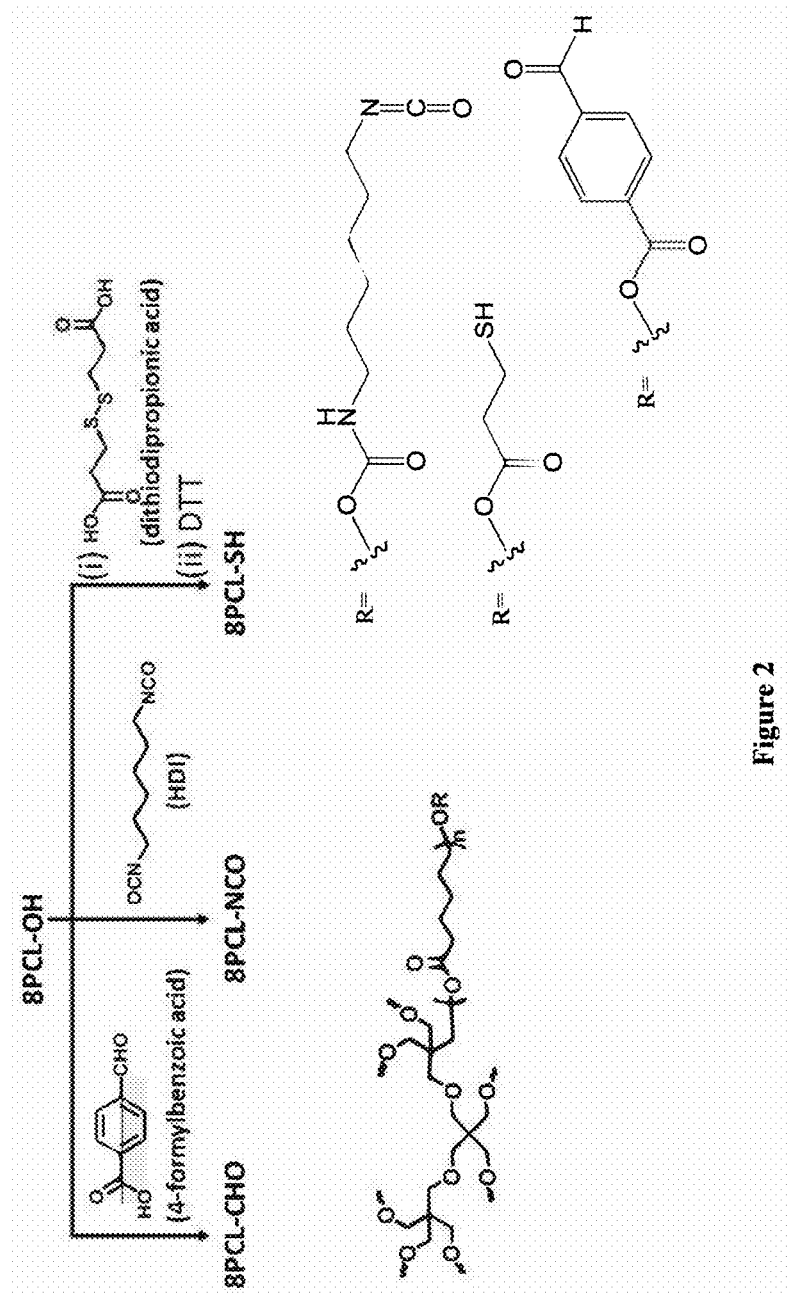
FIG. 2 represents a synthesis scheme of 8-armed PCL-CHO, PCL-NCO and PCL-SH.

In some embodiments, the star polymer of the invention comprises 8-armed PCL-CHO (aldehyde), wherein PCL-CHO is as exemplified by FIG. 2. In some embodiments, the homopolymer comprises any of PEG, PCL, and PLA.

In some embodiments, the homopolymer is PEG-NHS. In some embodiments, the homopolymer is PCL-NHS. In some embodiments, the homopolymer is PCL-aldehyde. In some embodiments, the homopolymer is PCL-isocyanate. In some embodiments, the star polymer of the invention comprises a 2-6-armed co-polymer comprising NHS group as a terminating segment. In some embodiments, the star polymer of the invention comprises a 2-6-armed co-polymer comprising the tissue-binding group, wherein the tissue-binding group is as described hereinabove. In some embodiments, the star polymer of the invention comprises a 6-10-armed co-polymer comprising the tissue-binding group. In some embodiments, the star polymer of the invention comprises a 4-armed co-polymer comprising the tissue-binding group. In some embodiments, the star polymer of the invention comprises a 6-armed co-polymer comprising the tissue-binding group. In some embodiments, the star polymer of the invention comprises a 8-armed co-polymer comprising the tissue-binding group.

In some embodiments, the co-polymer is PEG-PLA-NHS copolymer. In some embodiments, the co-polymer is PEG-PCL-NHS copolymer.

In some embodiments, the star polymer of the invention is 2-10, 4-8, or 4-6-armed PEG-PLA-X. In some embodiments, the star polymer of the invention is 2-10, 4-8, or 4-6-armed PEG-PLA-NHS. In some embodiments, the star polymer of the invention is 2-10, 4-8, or 4-6-armed PEG-PCL-X. In some embodiments, the star polymer of the invention is 2-10, 4-8, or 4-6-armed PEG-PCL-NHS.

In some embodiments, the star polymer of the invention is a 4-armed PCL-NHS. In some embodiments, the star polymer of the invention is a 6-armed PCL-NHS. In some embodiments, the star polymer of the invention is a 8-armed PCL-NHS. In some embodiments, the star polymer of the invention is a 8-armed PCL-X or a 8-armed PEG-X. In some embodiments, the tissue-binding group (X) is selected from the group consisting of isocyanate, aldehyde, benzaldehyde, and thiol or a combination thereof.

In some embodiments, the star polymer of the invention is a 4-armed PEG-PLA-NHS. In some embodiments, the star polymer of the invention is a 6-armed PEG-PLA-NHS. In some embodiments, the star polymer of the invention is an 8-armed PEG-PLA-NHS.

In some embodiments, the star polymer of the invention is a 4-armed PEG-PCL-NHS. In some embodiments, the star polymer of the invention is a 6-armed PEG-PCL-NHS. In some embodiments, the star polymer of the invention is an 8-armed PEG-PCL-NHS.

Molecular structures of exemplary star polymers are represented by FIG. 1 and by FIG. 2.

Non-limiting examples of star-polymers are represented by Tables 1, 2 and by FIG. 2.

Synthesis of Branched Polymers

In some embodiments, a synthetic route for production of the branched polymer comprises three major steps such as: 1) initiation of polymerization and chain propagation, resulting in a branched polymer of the desired molecular weight and composition; 2) chain extension by reacting the polymeric segment with a linker, comprising a pre-reactive group; 3) conversion of the pre-reactive group into the tissue-binding group.

In some embodiments, the polymerization is initiated by mixing a branched core unit, a monomer and a catalyst using appropriate molar ratios. Upon chain propagation, such process results in a branched polymer with the same chemical composition of any one of the arms.

In some embodiments, the polymerization is executed in a stepwise process, (e.g. by using a protected core unit). Herein, the polymerization proceeds independently on any one of the core branches, resulting in a branched polymer with a different chemical composition of any one of the arms.

1. Initiation and Chain Propagation

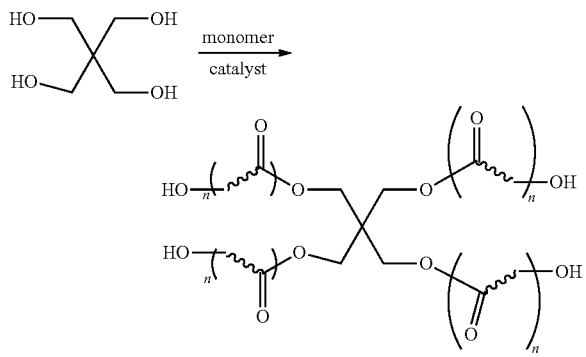

2. Chain Extension

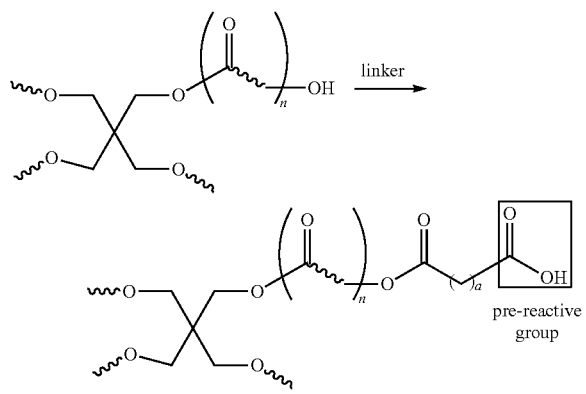

3. Conversion

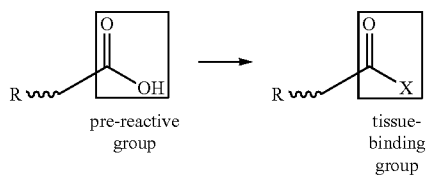

In some embodiments, the monomer is a cyclic monomer and the polymerization proceeds via a ring-opening polymerization.

In some embodiments, the branched polymer is synthesized by reacting the core unit (such as pentaerythritol) with a sufficient amount of ε-caprolactone and a catalytic amount of $Sn(Oct)_2$. Exemplary conditions required for the synthesis of branched polymers are extensively described hereinbelow (such as in the Examples section).

In some embodiments, a branched co-polymer is synthesized by reacting a branched homopolymer comprising a plurality of first monomers (such as 2-10-armed PEG) with a second monomer (e.g. ε-caprolactone) under conditions suitable for polymerizing the second monomer, thereby obtaining the co-polymer (such as PEG-PCL). In some embodiments, the conditions suitable for polymerizing are as described herein (e.g., in the Examples section).

In some embodiments, the chain extension is performed by a click reaction.

In some embodiments, the tissue-binding group is introduced by chemical modification on the polymer chain, resulting in a polymeric segment comprising one or more tissue-binding groups. Exemplary methods of introducing a tissue-binding group are represented by FIG. 2.

In some embodiments, the tissue-binding group is introduced by chemical modification of the terminal group of the polymeric segment. For example, a terminal hydroxyl group of PCL can be converted into a chloroformate by a chemical modification, comprising a reaction of PCL with phosgene.

In some embodiments, the polymeric segment has a nucleophilic terminal group (e.g. hydroxyl group), thus the chain extension comprises reacting the terminal group with a linker comprising an electrophile (e.g. carboxylic group) and optionally a protected pre-reactive group. Coupling of the alcohol with the carboxylic acid may be achieved by standard coupling methods making use of coupling reagents, such as N,N-dicyclohexylcarbodiimide (DCC), (benzotri- azol-1-yloxy)tris(dimethylamino) phosphonium hexafluorophosphate (BOP), (1-[bis(dimethylamino) methylene]-1H-1,2,3-triazolo[4,5-b]pyridinium3-oxide hexafluorophosphate) (HATU) and the like.

In some embodiments, the polymeric segment undergoes chain extension by reacting the terminal group with a chain extender (e.g. a cyclic anhydride). The resulting pre-reactive carboxylic group can be further converted to the tissue-binding group.

The non-limiting examples of chain extenders include but are not limited to: succinic anhydride (substituted or not substituted), glutaric anhydride (substituted or not substituted), lactone (e.g. butyrolactone or valerolactone), succinic acid (with one protected carboxyl), activated succinic acid (e.g. mono NHS-ester, pentafluorophenyl ester), or any combination thereof.

Non-limiting examples of pre-reactive groups include, but are not limited to: carboxyl, alcohol and amine, or any combination thereof.

In some embodiments, the pre-reactive group is a carboxyl. The carboxyl may be further converted to the tissue-binding group (e.g. NHS-ester) by esterification, making use of coupling reagents, such as: N,N-dicyclohexylcarbodiimide (DCC), (benzotriazol-1-yloxy)tris(dimethylamino)phosphonium hexafluorophosphate (BOP), (1-[bis(dimethylamino)methylene]-1H-1,2,3-triazolo[4,5-b]pyridinium3-oxide hexafluorophosphate) (HATU) and the like.

Physical Properties

It is desirable that the physical properties of a bioadhesive resemble those at the site of application as closely as possible, so that it may tolerate the forces acting on it and minimize shear by deforming with its surroundings. The physical properties of a polymer, such as elasticity are temperature dependent. A bioadhesive polymer suitable for use in-vivo, should exhibit a viscoelastic behavior and a sufficient tensile strength at the temperature of application, which is the temperature of a human and/or animal body. In order to provide a viscoelastic behavior, the bioadhesive polymer should have a glass-transition temperature far below 37° C. In order to provide a sufficient strength at the site of application, the bioadhesive polymer has to be solid at the temperature of a human and/or animal body. Thus, the melting temperature of the polymer has to be above 37° C. Additionally, it is desirable that the elastic and shear storage moduli of the bioadhesive polymer are compatible with elastic and shear storage moduli of the biological tissue adhered thereto. A bioadhesive polymer (also referred to as an implant) being compatible with the biological tissue to which it is applied increases tolerability of such an implant (e.g., by inducing less scar and/or inflammation, as represented by FIG. 6 and by FIG. 10).

Figure 3A:
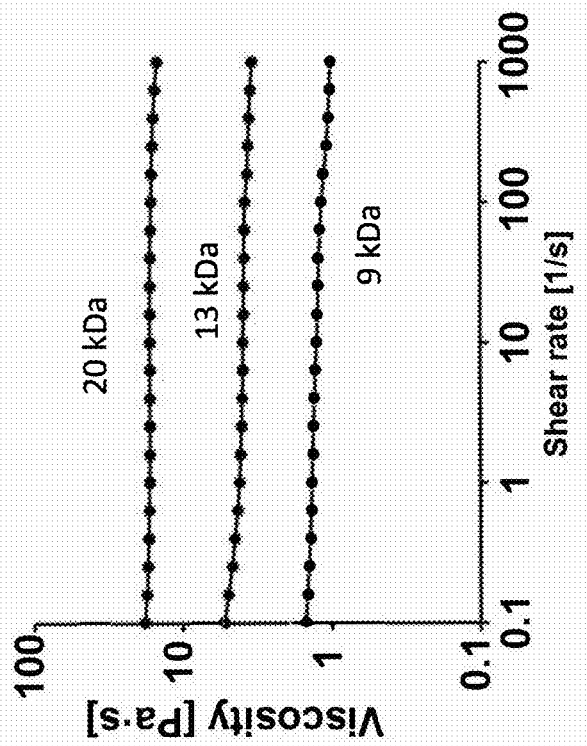
FIGS. 3A-B represent rheological character of 4-armed PCL-NHS ($M_n$ of 9 kDa, 13 kDa and 20 kDa).
Figure 3B:
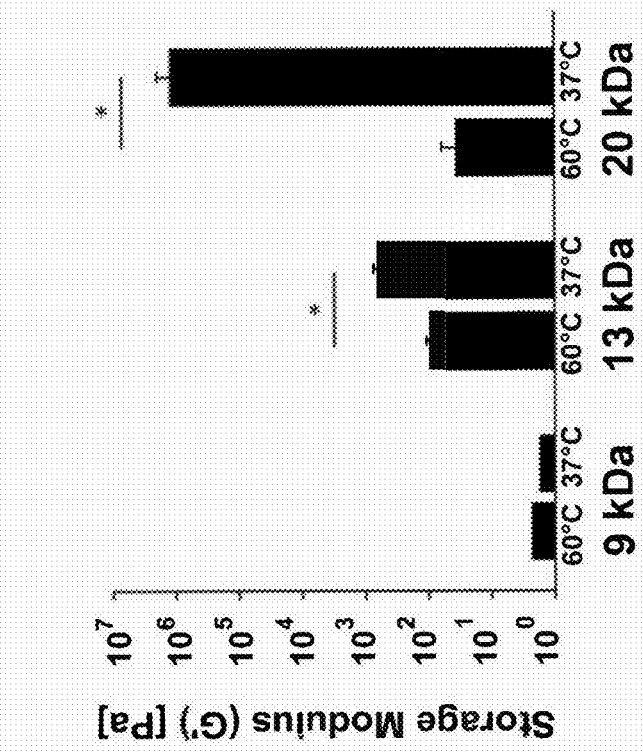

In some embodiments, the composition of the present invention comprises a biodegradable and biocompatible polymer, wherein the polymer provides a required strength and elasticity and is therefore suitable for use on the biological surface. In some embodiments, the polymer provides a viscoelastic behavior at 37° C. (as represented by FIG. 3B). In some embodiments, the polymer provides a required tensile strength at 37° C. (as represented by FIG. 3A).

In some embodiments, the number average molecular weight of the polymer is 80,000 Da or less, or 50,000 Da or less, or 20,000 Da or less, or 10,000 Da or less, or 5,000 Da or less. In some embodiments, the number average molecular weight of the polymer ranges from 1,000 Da to 80,000 Da. In some embodiments, the number average molecular weight of the polymer ranges from 50,000 Da to 80,000 Da. In some embodiments, the number average molecular weight of the polymer ranges from 40,000 Da to 60,000 Da. In some embodiments, the number average molecular weight of the polymer ranges from 8,000 Da to 40,000 Da, from 5,000 to 15,000 Da, from 5,000 to 10,000 Da, from 5,000 to 14,000 Da, from 10,000 to 15,000 Da, from 15,000 to 20,000 Da, from 15,000 to 25,000 Da, from 20,000 to 25,000 Da, including any range or value therebetween. In some embodiments, the number average molecular weight of the polymer ranges from 5,000 Da to 20,000 Da. In some embodiments, the number average molecular weight of the polymer ranges from 10,000 Da to 15,000 Da.

In some embodiments, the polymer has a melting temperature (Tm) in the range from 37 to 70° C.

In some embodiments, the polymer has a Tm greater than 37° C., a Tm greater than 40° C., a Tm greater than 50° C., a Tm greater than 60° C., a Tm greater than 70° C.

In some embodiments, the polymer has a glass-transition temperature (Tg) below 37° C.

In some embodiments, the branched polymer (e.g., star polymer) of the invention is characterized by a polydispersity index (PDI) between 1.0 and 1.5, between 1.0 and 1.1, between 1.1 and 1.2, between 1.2 and 1.3, between 1.3 and 1.5, between 1.3 and 1.4, including any range or value therebetween.

In some embodiments, the branched polymer (e.g., star polymer) has a melting point between 37 and 70° C., between 37 and 40° C., between 40 and 45° C., between 45 and 50° C., between 41 and 45° C., between 45 and 52° C., between 50 and 52° C., between 52 and 55° C., between 55 and 60° C., between 60 and 70° C., between 60 and 65° C., including any range or value therebetween.

In some embodiments, the branched polymer has a melting point above 37° C., above 39° C., above 40° C., above 42° C., above 45° C., above 50° C., above 55° C., above 57° C., above 60° C., including any range or value therebetween.

Physical properties of exemplary polymers are described in Table 1 and in Table 2.

In some embodiments, the branched polymer (e.g., star polymer) is characterized by adhesion strength between 0.5 and 20 N/cm$^{-2}$, between 0.5 and 2 N/cm$^{-2}$, between 2 and 20 N/cm$^{-2}$, between 2 and 15 N/cm$^{-2}$, between 15 and 20 N/cm$^{-2}$, between 2 and 10 N/cm$^{-2}$, between 2 and 5 N/cm$^{-2}$, between 5 and 10 N/cm$^{-2}$, between 5 and 15 N/cm$^{-2}$, between 5 and 20 N/cm$^{-2}$, between 5 and 10 N/cm$^{-2}$, between 10 and 20 N/cm$^{-2}$, including any range or value therebetween.

In some embodiments, the branched polymer (e.g., star polymer) is characterized by adhesion strength of at least 1 N/cm$^{-2}$, at least 2 N/cm$^{-2}$, at least 5 N/cm$^{-2}$, at least 10 N/cm$^{-2}$, at least 8 N/cm$^{-2}$, at least 12 N/cm$^{-2}$, at least 15 N/cm$^{-2}$, including any range or value therebetween. Adhesion strength as used herein, is measured as described hereinbelow.

In some embodiments, the adhesion strength is predetermined by branching degree. In some embodiments, the adhesion strength is controllable by changing the number of arms of the branched polymer. In some embodiments, the adhesion strength is increased by increasing the number of arms of the branched polymer. FIG. 7 represents correlation between adhesion strength and the arm number of an exemplary branched polymer.

In some embodiments, the adhesion strength is increased by increasing the number of tissue-binding groups within the branched polymer.

Figure 4A:
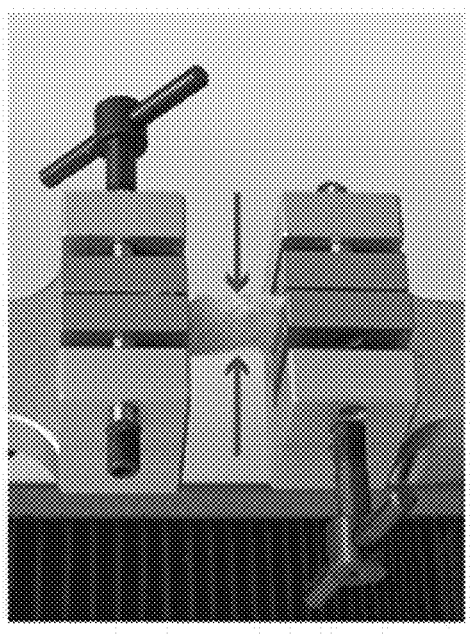
FIGS. 4A-D represent adhesive strength testing of 4-armed PCL-NHS ($M_n$ of 9 kDa, 13 kDa and 20 kDa).
Figure 4B:
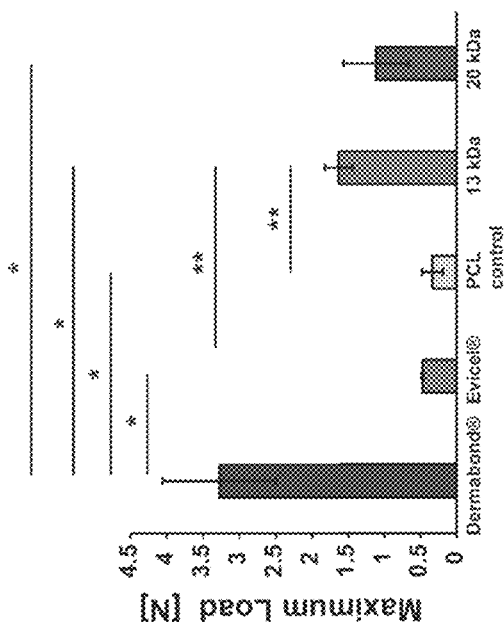
Figure 4D:
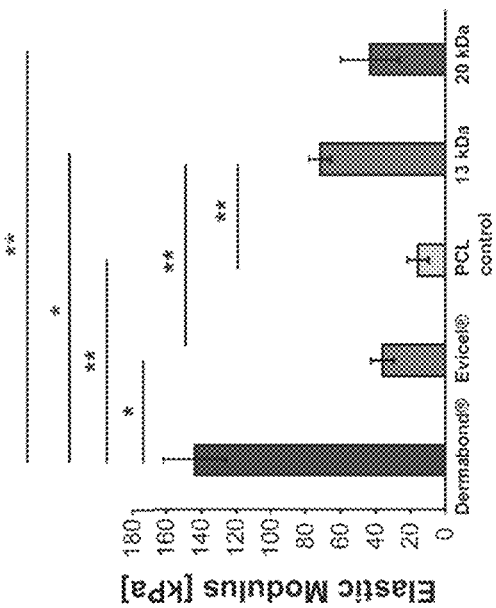
Figure 4C:
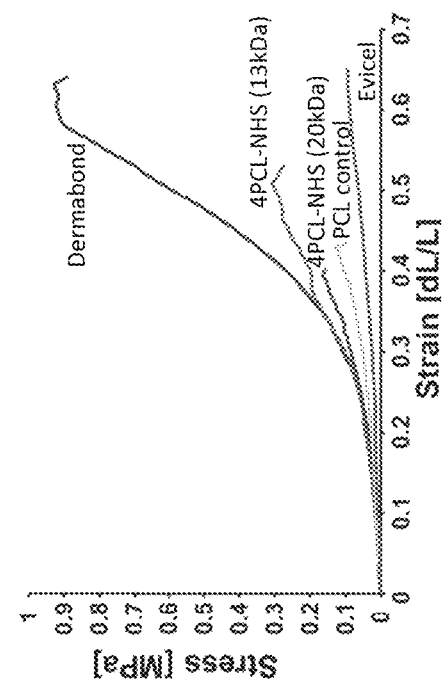

In some embodiments, the adhesion strength of the branched polymer with a biological tissue (also referred to as "bioadhesion") is predetermined by a chemical composition of the polymeric segment, wherein the branched polymer is as described hereinabove (e.g., star polymer). In some embodiments, bioadhesion of the branched polymer is controllable by changing a chemical composition of the polymeric segment, (as exemplified by FIG. 12). In some embodiments, bioadhesion of the branched polymer is controllable by changing a number of arms. In some embodiments, 2-armed branched polymer (e.g. PCL-NHS) is characterized by insufficient adhesive strength compared to 4-armed PCL-NHS. In some embodiments, the branched polymer has to comprise at least 4 arms so as to provide a sufficient adhesive strength. In some embodiments, 4-armed PEG-PLA-NHS is characterized by a superior bioadhesion compared to 4-armed PEG-NHS and/or to 4-armed PEG-PCL-NHS (as exemplified by FIG. 12). In some embodiments, a branched polymer characterized by a sufficient adhesive strength comprises at least 3, at least 4, at least 5, at least 6, at least 7, at least 8 arms. In some embodiments, a branched polymer characterized by adhesive strength sufficient for bioadhesion comprises at least 3, at least 4, at least 5, at least 6, at least 7, at least 8 arms (as exemplified by FIG. 4B and by FIG. 7).

In some embodiments, bioadhesion of the branched polymer is predetermined by a chemical composition of the termination segment. In some embodiments, bioadhesion of the branched polymer is predetermined by a chemical composition of the tissue-binding group. As exemplified by FIG. 9, a branched polymer having NHS as a tissue-binding group is characterized by superior adhesion strength compared to a thiolated branched polymer. In some embodiments, any of NHS, aldehyde, and isocyanate tissue-binding group are characterized by a superior adhesion strength compared to a thiolated branched polymer. In some embodiments, any of NHS, aldehyde, and isocyanate tissue-binding group are biocompatible (induce less scaring, and/or less inflammation), as exemplified by FIG. 10 and by FIG. 6.

In some embodiments, the polymer has an adhesive strength of more than 1.0N. In some embodiments, the polymer has an adhesive strength of more than 0.5N. In some embodiments, the polymer has an adhesive strength of more than 1.0N. In some embodiments, the polymer has an adhesive strength of more than 1.5N. In some embodiments, the polymer has an adhesive strength of more than 2.0N. In some embodiments, the polymer has an adhesive strength of more than 3.0N.

In some embodiments, the elasticity of the polymer is expressed by elastic modulus. In some embodiments, the polymer has an elastic modulus of more than 20 kPa. In some embodiments, the polymer has an elastic modulus of more than 40 kPa. In some embodiments, the polymer has an elastic modulus of more than 70 kPa. In some embodiments, the polymer has an elastic modulus of more than 80 kPa. In some embodiments, the polymer has an elastic modulus of more than 100 kPa. In some embodiments, the polymer has an elastic modulus of more than 200 kPa. In some embodiments, the polymer has an elastic modulus in the range from 10 to 200 kPa. In some embodiments, the polymer has an elastic modulus in the range from 10 to 40 kPa. In some embodiments, the polymer has an elastic modulus in the range from 20 to 40 kPa. In some embodiments, the polymer has an elastic modulus in the range from 30 to 80 kPa. In some embodiments, the polymer has an elastic modulus in the range from 70 to 100 kPa.

In some embodiments, the polymer has an elastic modulus in the range from 100 to 200 kPa, from 20 to 100 kPa, from 30 to 100 kPa, from 30 to 80 kPa, from 30 to 60 kPa, from 30 to 50 kPa, from 40 to 80 kPa, from 40 to 100 kPa, from 50 to 100 kPa, from 50 to 70 kPa, including any range or value therebetween.

In some embodiments, the tensile strength is expressed by shear storage modulus. In some embodiments, the polymer has a shear storage modulus of more than 1 kPa. In some embodiments, the polymer has a shear storage modulus of more than 1 kPa. In some embodiments, the polymer has a shear storage modulus of more than 5 kPa. In some embodiments, the polymer has a shear storage modulus of more than 10 kPa. In some embodiments, the polymer has a shear storage modulus of more than 12 kPa. In some embodiments, the polymer has a shear storage modulus of more than 13 kPa. In some embodiments, the polymer has a shear storage modulus of more than 15 kPa. In some embodiments, the polymer has a shear storage modulus of more than 20 kPa. In some embodiments, the polymer has a shear storage modulus of more than 40 kPa. In some embodiments, the polymer has a shear storage modulus of more than 60 kPa. In some embodiments, the polymer has a shear storage modulus of more than 80 kPa. In some embodiments, the polymer has a shear storage modulus in the range from 1 to 100 kPa. In some embodiments, the polymer has a shear storage modulus in the range from 1 to 20 kPa. In some embodiments, the polymer has a shear storage modulus in the range from 5 to 15 kPa. In some embodiments, the polymer has a shear storage modulus in the range from 20 to 40 kPa. In some embodiments, the polymer has a shear storage modulus in the range from 40 to 60 kPa. In some embodiments, the polymer has a shear storage modulus in the range from 60 to 80 kPa. In some embodiments, the polymer has a shear storage modulus in the range from 80 to 100 kPa. In some embodiments, the polymer has shear storage modulus of more than 100 kPa, wherein values of the shear storage modulus provided herein were measured at 37° C.

Figure 8:
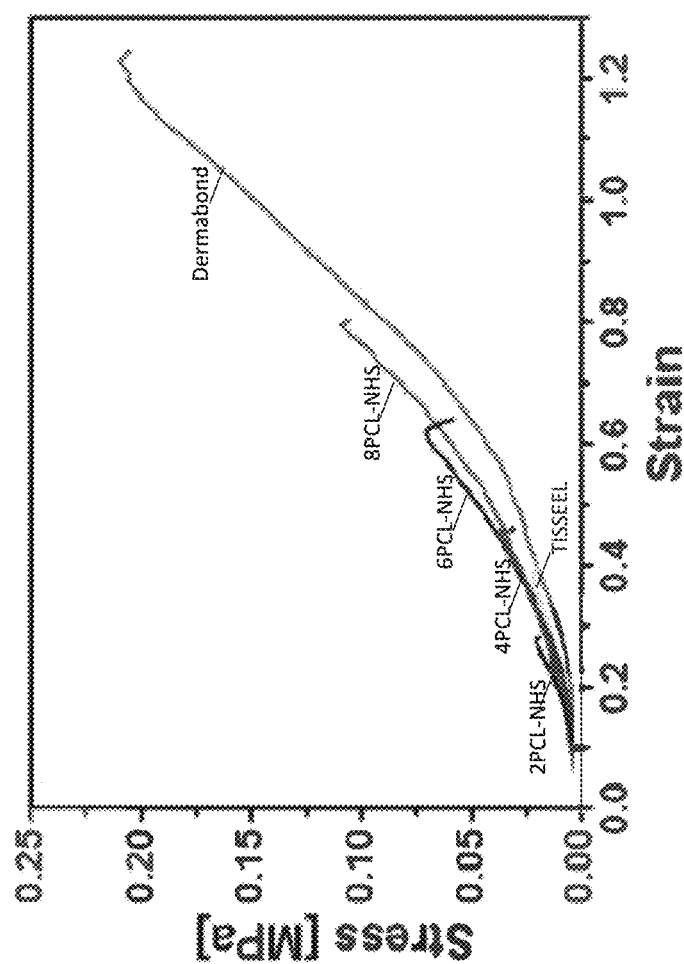
FIG. 8 represents graphs showing strain-stress curves of the tested polymers.

In some embodiments, 2-armed branched polymer has an insufficient tensile strength, such as for bioadhesion (FIG. 8). In some embodiments, a branched polymer characterized by a sufficient tensile strength comprises at least 3, at least 4, at least 5, at least 6, at least 7, at least 8 arms.

In some embodiments, the branched polymer has shear storage modulus between 1 and 3,000 kPa, between 100 and 2,000 kPa, between 500 and 2,000 kPa, between 800 and 1,000 kPa, between 1 and 300 kPa, between 1 and 100 kPa, between 1 and 50 kPa, between 1 and 10 kPa, between 0.5 and 5 kPa, between 0.5 and 2 kPa, between 0.5 and 1 kPa, including any range or value therebetween, wherein values of the shear storage modulus were measured at 37° C. In some embodiments, the branched polymer is characterized by a shear storage modulus sufficient for bioadhesion, wherein a range of the shear storage modulus is as described hereinabove. In some embodiments, the branched polymer is characterized by shear storage modulus, sufficient for use a bioadhesive of a soft tissue.

In some embodiments, the branched polymer has shear storage modulus of between 10 and 5,000 Pa, between 10 and 1,000 Pa, between 10 and 500 Pa, between 10 and 200 Pa, between 10 and 100 Pa, when measured at 60° C. including any range or value therebetween.

In some embodiments, the branched polymer or the composition of the invention has an elastic modulus and a shear storage modulus being in a range of elastic and shear storage moduli of a biological tissue adhered thereto. In some embodiments, the biological tissue adhered to or in contact with the composition or the branched polymer (referred to as an implant) is a soft tissue. In some embodiments, elastic properties (e.g., shear storage modulus and elastic modulus) of the implant are compatible with a soft tissue. In some embodiments, the implant is substantially tolerable by the biological tissue adhered thereto. In some embodiments, the tolerability is characterized by scar width, and/or inflammation response, and/or by cell survival (see FIG. 5, FIG. 6, FIG. 10 and FIG. 11).

Composition

In some embodiments, the invention is directed to a composition comprising as an active ingredient a therapeutically effective amount of the polymer or its analog, and a pharmaceutically acceptable carrier and/or diluent. In some embodiments, the composition is a pharmaceutical composition.

In some embodiments, the composition comprises an additive. In some embodiments, the additive comprises at least one of a plasticizer, a pharmaceutically active ingredient, a coloring agent, and a thermosensitive indicator or a combination thereof. Several additives are well-known in the art.

In some embodiments, a w/w concentration of the additive within the composition or the pharmaceutical composition is from 0.01% to 10%, from 0.01% to 0.1%, from 0.1% to 0.5%, from 0.5% to 1%, from 0.1% to 0.3%, from 0.3% to 0.5%, from 0.5% to 0.7%, from 0.7% to 1%, from 1% to 1.5%, from 1.5% to 2%, from 2% to 2.5%, from 2.5% to 3%, from 3% to 3.5%, from 3.5% to 4%, from 4% to 5%, from 5% to 6%, from 6% to 7%, from 7% to 8%, from 8% to 10% including any range or value therebetween.

In some embodiments, the composition comprises additional pharmaceutically active ingredients such as: drugs (e.g. antibiotics, analgesics), anti-oxidants, growth factors, therapeutic proteins and or peptides, or other therapeutic molecules for wound healing, or any combination thereof.

For example, the term "pharmaceutically acceptable" can mean approved by a regulatory agency of the Federal or a state government or listed in the U.S. Pharmacopeia or other generally recognized pharmacopeia for use in animals, and more particularly in humans.

In addition, in vitro assays may optionally be employed to help identify optimal dosage ranges. The precise dose to be employed in the formulation will also depend on the route of administration, and the nature of the disease or disorder, and should be decided according to the judgment of the practitioner and each patient's circumstances. Effective doses can be extrapolated from dose-response curves derived from in-vitro or in-vivo animal model test bioassays or systems.

In one embodiment, it will be appreciated that the polymer of the present invention can be provided to the individual with additional active agents to achieve an improved therapeutic effect as compared to treatment with each agent by itself. An additional active agent is comprising any therapeutically active ingredient. In another embodiment, measures (e.g., dosing and selection of the complementary agent) are taken to adverse side effects which are associated with combination therapies.

In some embodiments, the composition of the present invention is administered in a therapeutically safe and effective amount. As used herein, the term "safe and effective amount" refers to the quantity of a component which is sufficient to yield a desired therapeutic response without undue adverse side effects, including but not limited to toxicity, such as calcemic toxicity, irritation, or allergic response, commensurate with a reasonable benefit/risk ratio when used in the presently described manner. In another embodiment, a therapeutically effective amount of the bioadhesive is the amount of the bioadhesive polymer mentioned herein necessary for the in vivo measurable expected biological effect. The actual amount administered, and the rate and time-course of administration, will depend on the nature and severity of the condition being treated. Prescription of treatment, e.g. decisions on dosage, timing, etc., is within the responsibility of general practitioners or specialists, and typically takes account of the disorder to be treated, the condition of the individual patient, the site of delivery, the method of administration and other factors known to practitioners. Examples of techniques and protocols can be found in Remington: The Science and Practice of Pharmacy, 21st Ed., Lippincott Williams & Wilkins, Philadelphia, Pa., (2005). In some embodiments, preparation of effective amount or dose can be estimated initially from in vitro assays. In one embodiment, a dose can be estimated from animal models and such information can be used to more accurately determine useful doses in humans.

As used herein, the terms "administering", "administration", and like terms refer to any method which, in sound medical practice, delivers a composition containing an active agent to a subject in such a manner as to provide a therapeutic effect.

In one embodiment, toxicity and therapeutic efficacy of the active ingredients described herein can be determined by standard pharmaceutical procedures in vitro, in cell cultures or experimental animals. In one embodiment, the data obtained from these in vitro and cell culture assays and animal studies can be used in estimating a range of dosage for use in human. In one embodiment, the dosages vary depending upon the dosage form employed and the route of administration utilized. In one embodiment, the route of administration and dosage can be chosen by the individual physician in view of the patient's condition. [See e.g., Goodman and Gilman's The Pharmacological Basis of Therapeutics, 13$^{th}$ Ed., McGraw-Hill/Education, New York, NY (2017)].

Pharmaceutical compositions containing the presently described polymer as the active ingredient can be prepared according to conventional pharmaceutical compounding techniques. See, for example, Remington: The Science and Practice of Pharmacy, 22$^{nd}$ Ed., Pharmaceutical Press, Philadelphia, PA (2012).

In one embodiment, compositions including the preparation of the present invention formulated in a compatible pharmaceutical carrier are prepared, placed in an appropriate container, and labeled for treatment of an indicated condition.

In some embodiments, compositions of the present invention are presented in a pack or dispenser device, such as an FDA approved kit, which contains, one or more unit dosages forms containing the active ingredient. In one embodiment, the pack, for example, comprises metal or plastic foil, such as a blister pack. In one embodiment, the pack or dispenser device is accompanied by instructions for administration. In one embodiment, the pack or dispenser is accommodated by a notice associated with the container in a form prescribed by a governmental agency regulating the manufacture, use or sale of pharmaceuticals, which notice is reflective of approval by the agency of the form of the compositions or human or veterinary administration. Such notice, in one embodiment, is labeling approved by the U.S. Food and Drug Administration for prescription drugs or of an approved product insert.

Administration

A bioadhesive polymer has to maintain its adhesion and cohesion strength and provide viscoelastic properties under application conditions (e.g. application temperature). The composition according to the present invention, comprises a polymer with a low melting temperature (Tm), thus making it suitable for topical application in molten form, without causing burns to the tissue on the site of application. Furthermore, the polymer has a glass transition temperature (Tg) below the temperature of the human or animal body, allowing it to solidify at the physiological environment after the administration. Since the application temperature of the polymer is in the range between Tg and Tm, the polymer will retain its viscoelastic properties upon in-vivo administration. The low Tg of the polymer is further beneficial for its physical properties, such as elasticity and rigidity. In some embodiments, the composition is biocompatible or tolerable by a surrounding tissue, as described hereinabove.

According to some embodiments, the composition is in solid state at 37° C. In some embodiments, the composition is a solid at a temperature between 30 and 40° C., between 30 and 37° C., between 30 and 35° C., between 35 and 40° C., between 30 and 42° C., between 30 and 45° C., between 30 and 50° C., between 30 and 55° C.

In some embodiments, the composition is a solid at a temperature of a human body. In some embodiments, the composition is a solid at a temperature of 1-10° C., 1-5° C., 5-10° C., 1-20° C., 10-15° C., 10-20° C., 15-20° C., above the temperature of a human body.

In some embodiments, the composition has a low Tm, making it suitable for topical application in molten form, without causing burns to the tissue on the site of application. Furthermore, the composition solidifies at the physiological environment and remains rigid yet elastic after the administration. In some embodiments, the composition or the branched polymer of the invention is devoid of a substantial scarring or fibrosis when applied to the subject as described herein. In some embodiments, the composition or the branched polymer of the invention induce substantially less scaring or inflammation as compared to a commercially available polymer (such as Dermabond), as represented by FIG. 6 and by FIG. 10.

In some embodiments, the composition of the present invention is administered topically using a method comprising following steps: (i) providing the solid composition under conditions suitable for melting the composition, to thereby melt the composition, and (ii) contacting the biological surface with the molten composition, thereby adhering or sealing the biological surface.

In some embodiments, an effective amount of the composition provided to a temperature of not more than 5° C. above the Tm of the composition.

In some embodiments, an effective amount of the composition provided to a temperature at the range from 37 to 70° C.

In some embodiments, an effective amount of the composition provided to a temperature of not more than 5° C. above the Tm of the composition, until the composition melts.

In some embodiments, an effective amount of the molten composition is applied to a biological surface within the subject.

In some embodiments, an effective amount of the molten composition is contacted with one or more biological surfaces within the subject, at a temperature ranging from 37 to 70° C.

In some embodiments, an effective amount of the composition is applied to one or more biological surfaces within the subject (e.g. as a sheet), the composition is further provided to a temperature suitable for melting.

In some embodiments, an effective amount of the composition is applied to one or more biological surfaces within the subject (e.g. as a sheet), the composition is further heated to a temperature that does not exceed 70° C., thereby resulting in in-situ melting of the composition.

The term "in-situ melting", as used herein, is related to the process of melting the composition on the application site, such as tissue surface. The method of in-situ melting further comprises contacting the molten composition with the biological surface. The in-situ melting of the composition can be achieved by applying an irradiation source (e.g. laser) to a solid composition on the application site.

In some embodiments, a subject is a human subject. In some embodiments, a subject is an animal. In some embodiments, a subject is a farm animal. In some embodiments, a subject is a pet.

In some embodiments, a subject in need of a method for wound healing suffers from burns. In some embodiments, a subject in need of a method for surgical incision closure undergoes a surgical intervention. In some embodiments, a subject in need of a method for wound closure suffers from leakage of body fluids, such as bleeding.

In some embodiments, contacting the biological surface with the molten composition, furthermore comprises contacting biological surfaces.

In some embodiments, biological surfaces are contacted allowing the applied composition to solidify, thereby adhering biological surfaces.

In some embodiments, the biological surface is contacted with the molten composition until the composition solidifies, thereby sealing the biological surface.

As used herein, the terms "administering", "administration", and like terms refer to any method which, in sound medical practice, delivers a composition containing an active agent to a subject in such a manner as to provide a therapeutic effect.

Kit

The present invention is further directed to a kit comprising the composition, as defined previously, and a heating apparatus and use thereof, such as for melting and administering the molten composition to a site of application.

In some embodiments, the kit comprises a solid composition of any shape.

In some embodiments, the kit comprises a stick-shaped composition in solid state.

In some embodiments, the kit comprises a heating apparatus, wherein the heating apparatus comprises a heating portion, further comprising an inlet opening to receive a solid composition, a heater for melting the solid composition and an outlet opening for injecting the molten composition outside the apparatus.

In some embodiments, the heating portion provides the solid composition to a temperature of not more than 5° C. above the Tm of the composition. In some embodiments, the heating portion provides the solid composition to a temperature in the range from 37 to 70° C., from 37 to 40° C., from 40 to 45° C., from 45 to 50° C., from 50 to 60° C., from 60 to 70° C. including any range therebetween.

In some embodiments, the heating portion of the heating device converts the solid composition into a molten state.

In some embodiments, the heating portion comprises a plate heater that extends around a substantially entire outer surface of the heating portion.

In some embodiments, the heating device further comprises a trigger for controlling the injection rate of the molten composition from the outlet opening.

In some embodiments, the trigger applies a force to the solid composition which moves the composition towards the heating portion, resulting in an expansion of the molten composition towards the outlet opening. The trigger is controlling the flow of the molten composition outside the apparatus.

Methods of Use

The present invention is directed to a method for adhering or sealing of at least one biological surface.

As used herein, the term "biological surface" refer to any surface comprising cells and/or biological molecules (e.g. proteins, polysaccharides, lipids, nucleic acids). Non-limiting examples of "biological surface" include, but are not limited to: tissue surface, synthetic graft surface, and organ surface.

In some embodiments, the present invention is directed to a method for bond formation to a biological surface, wherein the biological surface is selected from the group consisting of: tissue surface, synthetic graft surface, and organ surface in a subject in need thereof. In some embodiments, provided herein is a method for joining a tissue surface to another tissue, or for sealing a tissue surface in a subject in need thereof. In some embodiments, provided herein is a method for promoting/enhancing wound healing, in a subject in need thereof. In some embodiments, provided herein a method for wound closure in a subject in need thereof. In some embodiments, provided herein a method for sealing of joined tubular structures such as blood vessels in a subject in need thereof. In some embodiments, provided herein a method for sealing air leaks in the lung in a subject in need thereof. In some embodiments, the method is for reducing inflammation of the biological surface (e.g., sealed tissue). In some embodiments, the method is for reducing scar, fibrosis and/or adhesion of the biological surface (e.g., sealed tissue). In some embodiments, the method is for reducing inflammation of the biological surface (e.g., sealed tissue). In some embodiments, the method is for preventing, inhibiting, or reducing scar, fibrosis and/or adhesion of the biological surface (e.g., sealed tissue), wherein the method is as described hereinabove.

In another embodiment, the biological surface site is a surgical site. In another embodiment, the biological surface is a post-operative surgical site. In another embodiment, fibrosis, scarring and/or adhesion results from a surgical procedure. In another embodiment, fibrosis, scarring and/or adhesion results from blunt trauma or a fracture.

Adhesions are known in the art as abnormal, fibrous bands of scar tissue that can form inside the body as a result of the healing process that often follows open or minimally invasive surgical procedure including abdominal, gynecologic, cardiothoracic, spinal, plastic, vascular, ENT, ophthalmologic, urologic, neuro, or orthopedic surgery. Adhesions are typically connective tissue structures that form between adjacent injured areas within the body. Briefly, localized areas of injury trigger a healing response that culminates in healing and scar tissue formation. If scarring results in the formation of fibrous tissue bands or adherence of adjacent anatomical structures (that should normally be separate), adhesion formation is said to have occurred.

Post-surgical adhesions are a consequence resulting when injured or traumatized tissue surfaces, following incision, cauterization, suturing or other mechanical means of trauma, fuse together to form scar tissue. Adhesions can also occur in areas that have undergone blunt trauma or in tissue surrounding fractures. The mechanism of adhesion formation at a traumatized area is based on secretion of a tissue exudate, which in turn induces fibroblast proliferation and consequent formation of collagenous adhesions. These adhesions scar-up the tissue and lead to dysfunctional soft tissues.

In some embodiments, reducing adhesion includes a decrease in adhesion formation and does not require complete alleviation of adhesion signs or symptoms, and does not require a cure. In various embodiments, reducing adhesion formation includes even a marginal decrease in adhesion formation by for example at least 5%, 10%, 15%, 20%, 25%, 30%, 35%, 40%, 45% or higher decreases in adhesion formation or compared to control.

"Reducing adhesions" refers to administering the composition an/or the kit of the invention as described herein.

The composition or kit, according to the present invention is suitable for application to both internal and external surfaces of the body, i.e. they may be applied topically to the exterior of the body (e.g. to the skin) or to internal surfaces such as surfaces of internal organs exposed during surgical procedures, including conventional and minimally invasive surgery. In some embodiments, the composition or kit is suitable for sustaining internal surgical incision closure. In some embodiments, the composition or kit is suitable for surgical applications in the following areas: thoracic and cardiovascular, general surgery, urology. In some embodiments, the composition or kit is suitable for preventing or limiting intra and post-surgical bleeding and leakage of bodily fluids, e.g. after hepatobiliary and pancreatic surgery. In some embodiments, the composition or kit can be applied in the site that requires tissue repair, tissue sealing or other treatments. Furthermore, the materials described in this invention may be also used as coatings, i.e. materials capable of adhering to a surface while forming a layer on it. The materials and methods of application may involve the use of additional materials other than previously mentioned polymer.

In some embodiments, the composition or kit of the present invention can be used for local delivery of drugs or other therapeutic materials into tissues.

It should be noted that the term "adhesive" is used herein to describe materials capable of adhering to surfaces. The term "sealant" is defined as materials capable of adhering to a surface for preventing fluid leaks from the surface, in particular from internal tissues or organs, as well as from synthetic grafts and or implants. A sealant is also referred to materials, capable of self-adhering.

Unless otherwise indicated, the word "or" in the specification and claims is considered to be the inclusive "or" rather than the exclusive or, and indicates at least one of, or any combination of items it conjoins.

It should be understood that the terms "a" and "an" as used above and elsewhere herein refer to "one or more" of the enumerated components. It will be clear to one of ordinary skill in the art that the use of the singular includes the plural unless specifically stated otherwise. Therefore, the terms "a", "an" and "at least one" are used interchangeably in this application.

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

In the description and claims of the present application, each of the verbs, "comprise", "include" and "have" and conjugates thereof, are used to indicate that the object or objects of the verb are not necessarily a complete listing of components, elements or parts of the subject or subjects of the verb.

Other terms as used herein are meant to be defined by their well-known meanings in the art.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

EXAMPLES

Materials and Methods

Materials

Pentaerythritol, εsuccinic anhydride, pyridine anhydrous, N-hydroxy succinimide (NHS), N,N'-Dicyclohexylcarbodiimide (DCC), chloroform-d ($CDCl_3$), 1,6-hexanediol (Sigma-Aldrich, 99%), dipentaerythritol (Sigma-Aldrich, for synthesis tripentaerythritol (Sigma-Aldrich), ε-caprolactone (Alfa-Aesar, 99%), tin(II) 2-ethylhexanoate (Sigma-Aldrich, 99%), 4-dimethylaminopyridine (DMAP) (Sigma-Aldrich, 99%), hydrochloric acid (Sigma-Aldrich, 37%), N-hydroxysuccinimide (Sigma-Aldrich, 98%), Dulbecco's phosphate buffered saline (PBS) pH 7.4, Dulbecco's modified Eagle's medium (DMEM) were purchased from Sigma-Aldrich (St. Louis, MO). Penicillin-streptomycin, fetal bovine serum (FBS), and L-glutamine were purchased from Biological Industries (Israel). A CellTiter 96 Aqueous One Solution Cell Proliferation Assay (MTS) kit was purchased from Promega (Fitchburg, WI). 2-Octyl-CA (Dermabond®) and Fibrin (Evicel®) were purchased from Ethicon Inc. (Somerville, NJ). N,N'-Diisopropylcarbodiimide (DIC) (Sigma-Aldrich, 99%), 4-formylbenzoic acid (Sigma-Aldrich, 97%), 6-Maleimidohexanoic acid (Sigma-Aldrich, 98%), hexamethylene diisocyanate (Sigma-Aldrich, 98%), dibutyltin dilaurate (Sigma-Aldrich, for synthesis), dithiodipropionic acid (Sigma-Aldrich, 98%), DL-dithiothreitol (Chem-Impex International, 99%), dichloromethane (Sigma-Aldrich, 99% or anhydrous), methanol (Sigma-Aldrich, 99%), toluene (Sigma-Aldrich, anhydrous, 99%).

Mechanical Properties

The synthesized polymers were evaluated for their rheological properties using Discovery Hybrid Rheometer (DHR-2, TA Instruments, DE, USA) equipped with parallel 40 mm diameter plate. Samples of the melted polymers were placed between parallel plates at 70° C. The gap between the plates was set to 0.25 mm, and excesses were trimmed off. The instrument was controlled by Trios program (TA Instruments, DE, USA). First, shear storage modulus (G') and Shear loss modulus (G") were measured during strain-sweep test between 0.01% and 10% at a constant 1 Hz frequency, to determine the linear viscoelastic region. Then, the viscosity of the polymers was measured as a function of shear rate between 0.1 and 1,000 s$^{-1}$. Next, G' and G" were measured during a temperature ramp between 70° C. and 37° C. at a constant 1 Hz frequency and a constant shear strain of 1%.

The adhesion strength was evaluated using a Lloyd universal testing machine (AMETEK Inc., Berwyn, PA) equipped with a 100 N load cell, at a cross-head speed of 10 mm min$^{-1}$.

Example 1

Synthesis of 4-Armed PCL Polymers and Characterization 0.2723 gr pentaerythritol (0.002 mol) was mixed in 150 ml toluene and heated to ~110° C. After removing around 40 ml toluene and water using dean-stark, 19.15 ml ε-caprolactone (0.1728 mol) monomers and 1.12 ml Sn(Oct)$_2$ (0.003456 mol) catalyst were added to the mixture and were left to react overnight. Following, the mixture was concentrated using rotary evaporator to remove the toluene. The mixture was dissolved in minimal amount of dichloromethane (DCM) and was precipitated in ice-cold methanol (MeOH). Solvent residuals were removed by an oil pump and the star-polycaprolactone (4-armed star-PCL) product was kept in a desiccator. Other molecular weight polymers were synthesized by the same procedure, with molar ratio changes.

The star-PCL products of this reaction were then characterized for their molecular weights by gel permeation chromatography (GPC), using a Viscotek VE 1122 (Malvern Instruments, UK) with PSS GRAM 1,000 Å+PSS GRAM 30 Å columns (PSS, Germany) in tetrahydrofuran (THF). The products were also evaluated for their melting temperatures using differential scanning calorimetry (DSC), equipped with a high-sensitivity sensor HSS7 (Mettler Toledo, Philippines Inc.).

Example 2

Substitution and Characterization of Star-Polymers Star-PCL-NHS 5 gr of the star-PCL product (0.00025 mol) were mixed with 1 gr of succinic anhydride (0.01 mol) in the presence of 25 ml anhydrous pyridine and were let stir in 50° C. overnight. Next, the star-PCL-COOH product was concentrated using rotary evaporator to remove the pyridine. The mixture was dissolved in minimal amount of dichloromethane (DCM) and was precipitated in ice-cold methanol (MeOH) three times, to remove any pyridine residuals. Solvent residuals were removed by an oil pump and the product was kept in a desiccator. Next, 2.5 gr of star-PCL-COOH (0.00012 mol) and 0.568 gr of N-hydroxy succinimide (NHS, 0.005 mol) were dissolved in 50 ml dimethylformamide (DMF). Next, 1.02 gr of N,N'-Dicyclohexylcarbodiimide (DCC, 0.005 mol) dissolved in 20 ml DMF were added dropwise, and the reaction was incubated under 4° C. overnight. The reaction products were filtered to dispose the urea salts, and the resulting mixture was then concentrated using rotary evaporator to remove the DMF. The mixture was dissolved in minimal amount of dichloromethane (DCM) and was precipitated in ice-cold methanol (MeOH) three times. All solvent residuals were removed by an oil pump and the product was kept in a desiccator.

Star-PEG-NHS 5 gr star-PEG (5 kDa, 0.001 mol) were dissolved in 25 ml anhydrous pyridine at 50° C. Then, 4 gr succinic anhydride (100.07 g/mol, 0.04 mol) was added dropwise and the reaction mixture was stirred overnight. After completion of the reaction pyridine was evaporated using rotary evaporator.

The residual crude was then dissolved in minimal amount of DCM and precipitates in ice-cold diethyl ether. This dissolution-precipitation step was repeated for 3 times resulting in a precipitate of star-PEG-COOH.

4 gr (5 kDa, 0.0008 mol) of star-PEG-COOH was dissolve in 25 ml DMF followed by addition of 3.7 gr N-hydroxysuccinimide (115.09 g/mol, 0.032 mol). To this mixture 6.6 gr N,N'-Dicyclohexylcarbodiimide (206.3 g/mol, 0.032 mol) in 50 ml DMF was added dropwise and the reaction mixture was stirred overnight at 4° C. Subsequently, the crude reaction mixture was filtered and the filtrated solution was evaporated to dryness using rotary evaporator. The residual crude was then precipitate in diethyl ether as described above.

Synthesis of 8PCL-CHO.

8PCL-OH (20 g, 1 mmol) and 4-formylbenzoic acid (4.8 g, 32 mmol) and DMAP (0.12 g, 1 mmol) was dissolved in anhydrous dichloromethane (100 mL). DIC (5.0 g, 40 mmol) was added slowly at 0° C. After 8 h, the reaction mixture was precipitated in cold methanol for three times to give the product in 90% yield.

Synthesis of 8PCL-NCO.

8PCL-OH (15 g, 0.75 mmol) was dissolved in 100 mL anhydrous toluene. Then, hexamethylene diisocyanate (HDI, 15 g, 90 mmol) and dibutyltin dilaurate (0.12 g, 0.2 mmol) was added. After stirred at room temperature for 2 h, the mixture was heated to 60° C. for 8 h. The product was obtained by precipitation in cold methanol for three times in 94% yield.

Synthesis of 8PCL-SH.

8PCL-OH (25 g, 1.25 mmol) and dithiodipropionic acid (15 g, 70 mmol) and DMAP (0.24 g, 2 mmol) was mixed in anhydrous dichloromethane (300 mL). At 0° C., DIC (12.6 g, 100 mmol) was added slowly. After 6 h, the mixture was precipitated in methanol. The solid was collected by filtration and dried in vacuum. The obtained solid and DL-dithiothreitol (DTT, 7.7 g, 50 mmol) were suspended in dichloromethane again and stirred for 8 h at room temperature. Then, the mixture was precipitated in cold methanol for three times to give the product in 76% yield.

The products from all reactions were evaluated for their chemical structure and substitution ratios by $^1$H nuclear magnetic resonance CH NMR), using a Bruker Avance III 400 MHz NMR spectrometer (Billerica, MA) in CDCl$_3$. Additionally, the synthesized polymers were characterized by gel permeation chromatography (GPC). GPC were measured in THF at 35° C. on Agilent 1200 Series instrument with polystyrenes as the standards.

TABLE 1

Characterization of synthesized nPCL-NHS.

| # of arms | $M_n{}^a$ [kg mol$^{-1}$] | $Đ^a$ | $M_n{}^b$ [kg mol$^{-1}$] | # of repeat units in each arm$^b$ | $T_m$ [° C.] |
|---|---|---|---|---|---|
| 2 | 6.1 | 1.50 | 5.7 | 23.0 | 51 |
| 4 | 13.2 | 1.51 | 10.7 | 21.5 | 49 |
| 6 | 16.4 | 1.53 | 15.0 | 20.2 | 48 |
| 8 | 22.3 | 1.58 | 21.3 | 21.2 | 50 |

$^a$Data from GPC measurements.
$^b$Data calculated from $^1$H NMR spectra.

TABLE 2

Characterization of synthesized 4-armed star homo-, and co-polymers.

| | $Mn^a$ [Da] | PDI$^b$ | $Mp^c$ [° C.] |
|---|---|---|---|
| Star-PEG-NHS | 9,783 | 1.05 | 48 |
| Star-PEG-PLA-NHS | 13,176 | 1.08 | 41.5 |
| Star-PEG-PCL-NHS | 8,727 | 1.39 | 44-51 |
| Star-PCL-NHS | 13,209 | 1.36 | 46 |

$^a$Molecular weight by number;
$^b$Polydispersity index;
$^c$Melting temperature.

Example 3

Figure 5A:
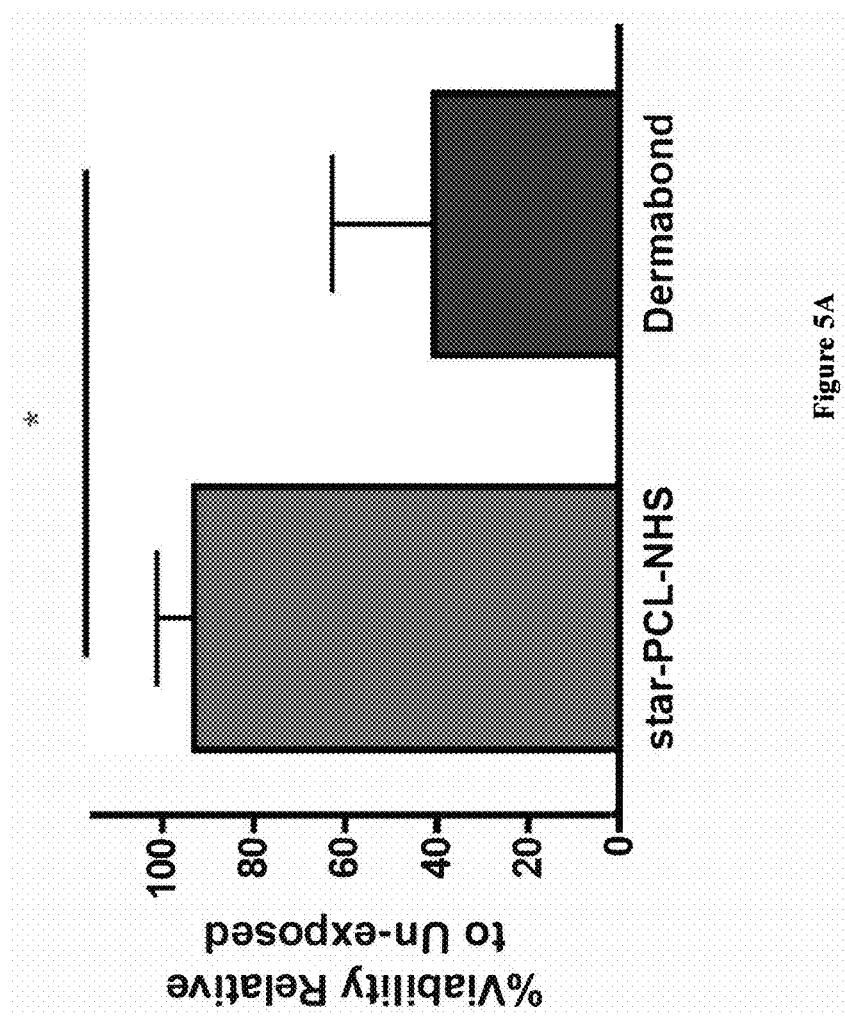
FIGS. 5A-B represent viability assay of 4-armed PCL-NHS compared to a control.
Figure 5B:
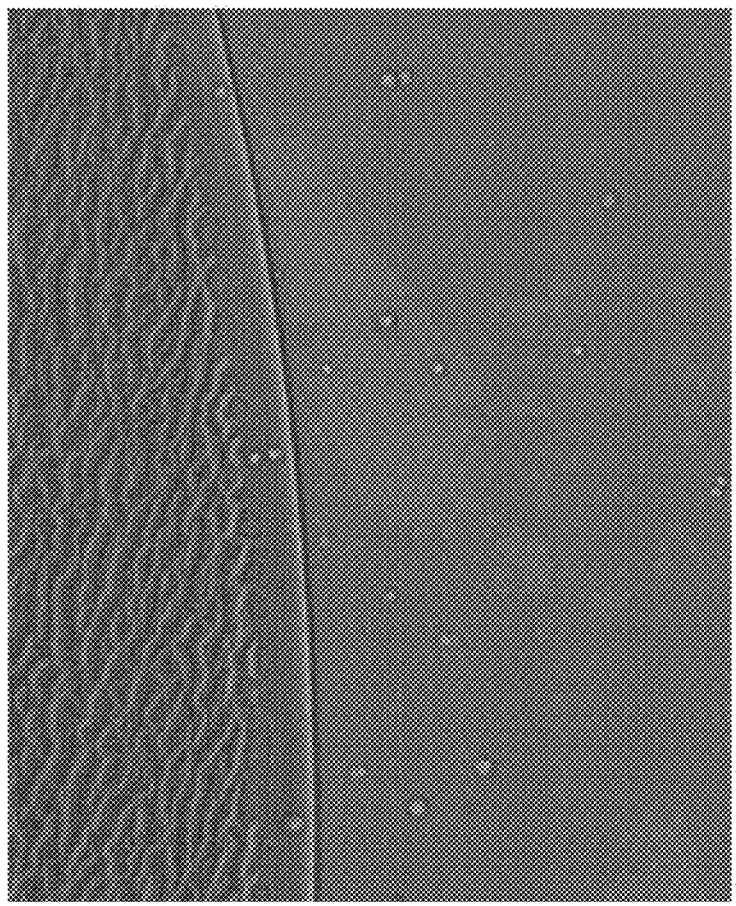

In-Vitro Cytotoxicity 5 mg of 4-armed-PCL-NHS (Table 1, entry 4) or 5 µL Dermabond® were placed in the center of each well in a 24-well plate (as represented by FIG. 5B). After curing, NIH 3T3 cells were seeded at a 6·10$^4$ cells/well density, and their viability was evaluated 24 hr later, relatively to unexposed cells, using CellTiter 96 solution MTS assay, according to manufacturer's protocol. The results of the test are represented by FIG. 5A. Although Dermabond® covered the same well area, after 24 hr the exposed cells appeared un-naturally round (FIG. 5B), and the test confirmed that only 40% of them maintained viability. The same type of cells reaction to cyanoacrylate was documented in the past.

Figure 11:
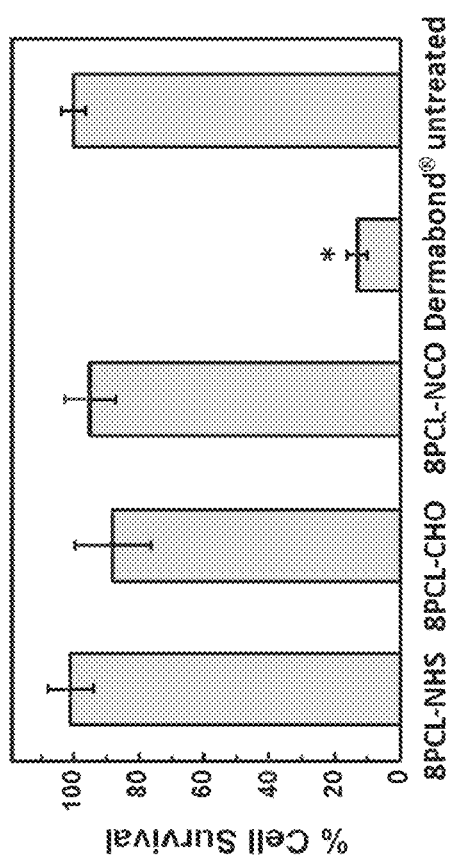
FIG. 11 is a bar graph representing cell survival of 3T3 cells for 24 h determined by MTS assay after incubation with 8PCL-NHS, 8PCL-CHO, 8PCL-NCO compared to Dermabond® and to untreated cells as a positive control. * indicates p<0.05 compared to the untreated cells.

The cytotoxicity of additional exemplary star-shaped polymers (8-armed PCL) was evaluated according to the above. CTC cells were used to assess the cytotoxicity of the materials. 10 mg of a star-shaped PCL or Dermabond were placed in Transwell® inserts and incubated with the cells in 24-well plates. After 24 h, cell viabilities were evaluated with the MTS assay, and their survival expressed as percentages of results in untreated cells. The results of the test are represented by FIG. 11. As shown by FIG. 11 and by FIG. 5A, the tested star-shaped polymers didn't exhibit a substantial cytotoxicity.

Example 4

In-Vivo Biocompatibility

Animals were cared for in compliance with protocol approved by the Boston Children's Hospital Committee, in conformity with the national Institutes of Health (NIH) guidelines for care and use of laboratory animals. 16 Sprague-Dawley male rats weighting 400-600 gr were used in 3 groups: control, Dermabond® and polymer glue (n=4). Rats were anesthetized under 2% isoflurane in oxygen, their dorsal aspect was shaved and disinfected with 70% ethanol in water and betadine. Next, a 1 cm long incision was made on each side. Several star-PCL-NHS or Dermabond® were deposited into the left side incision. 5-0 Ethilon nylon interrupted sutures (Ethicon, Belgium) were used to prevent wound dehiscence that could lead to an additional healing process related inflammation. The right-side incision was treated with sutures only, as a control, to set a baseline for the histologic changes induced by an incision and the healing process. Dermabond®, an FDA approved, commercially available tissue glue, was used as a positive control. After the surgery, rats were given a weight dependent single dose of 1.2 ml/kg Buprenorphine SR. Rats were euthanized with carbon dioxide ($CO_2$) after 96 hours or 14 days. A 1.5 cm$^2$ tissue area surrounding and including the 1 cm sutured incision was excised and sectioned perpendicular to the suture site. Tissues were processed, paraffin embedded, cut at 10 µm sections and stained with hematoxylin and eosin and Masson trichrome. Microscopic evaluations with light microscopy were performed by a pathologist in a masked fashion. The incision site was evaluated for 2 parameters: scarring along the incision line (highlighted by Masson trichrome staining) and inflammation (lymphocytes and macrophages) in the subcutaneous skeletal muscle layer. Each parameter was measured in terms of width (mm) and compared across groups with the Kruskal-Wallis test.

Figure 6B:
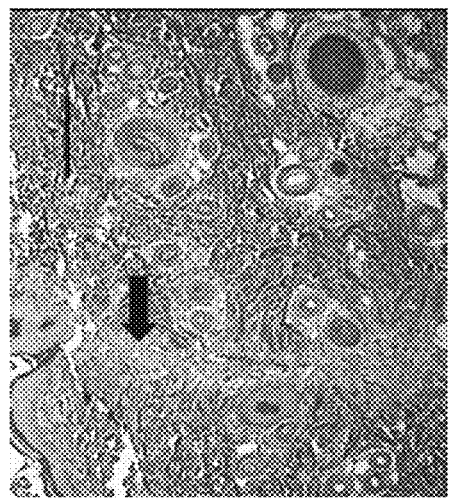
FIGS. 6A-D represent histologic assessment of in vivo biocompatibility of 4-armed PCL-NHS.
Figure 6A:
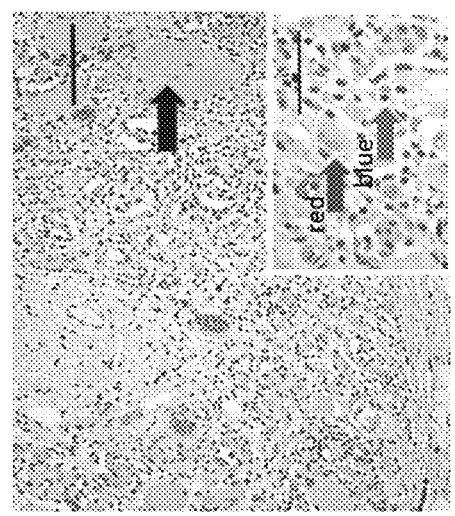
Figure 6C:
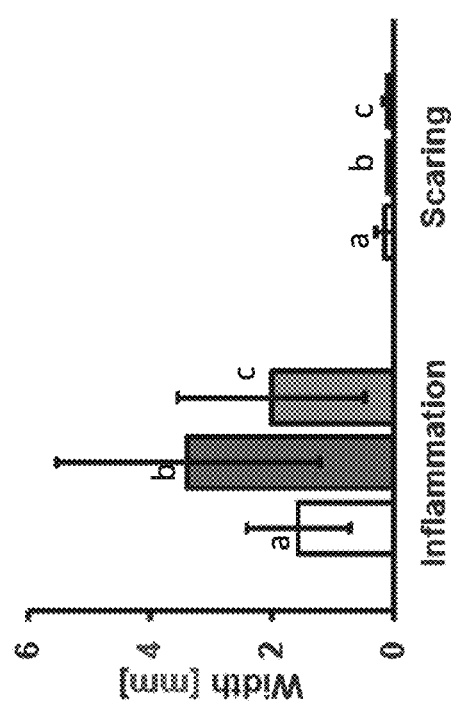
Figure 6D:
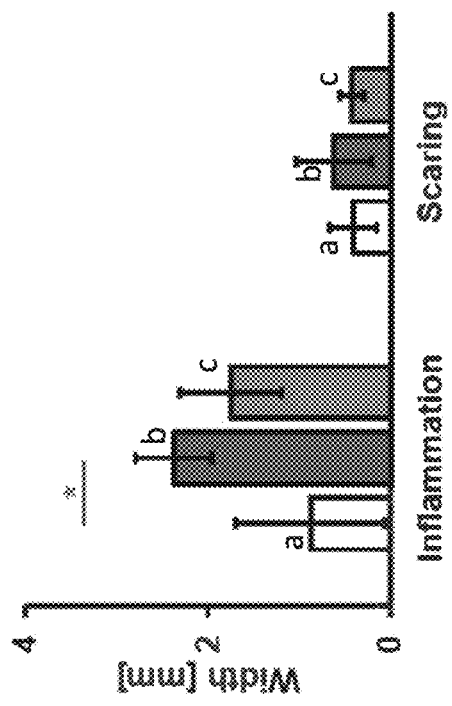

The inflammation was predominantly in the layer of subcutaneous muscle and consisted of lymphocytes, macrophages, edema and capillaries (FIG. 6A). The width of inflammation spanning the muscle was measured and compared across groups. Few or rare neutrophils were seen. No skin necrosis was observed. The scarring at the incision site extended from the surface of the skin (epidermis) through the subcutaneous muscular layer, up to the subcutaneous adipose tissue. Masson trichrome staining highlighted the scar (light blue staining, FIG. 6B), the width (mm) of which was compared across groups. On day 4, there was no significant difference in the amount of inflammation or scarring between the control, Dermabond® and the star-PCL-NHS groups (FIG. 6C). On day 14, Dermabond® induced significantly greater inflammation than the control group (p-value=0.03). There was no significant difference in inflammation amount between star-PCL-NHS and control groups. Also, no significant difference was observed in scaring between the 3 groups (FIG. 6D).

Figure 10:
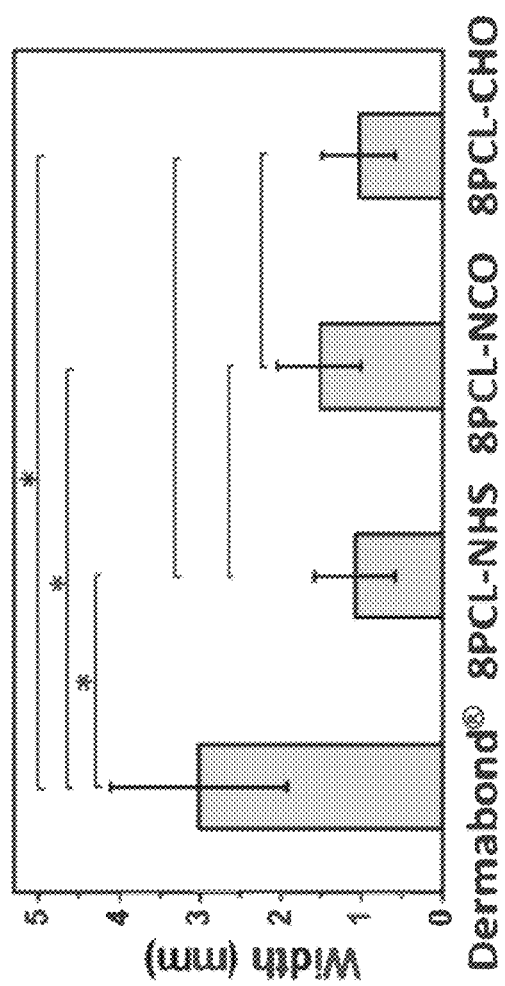
FIG. 10 is a bar graph representing scar width induced by 8PCL-NHS, 8PCL-CHO, 8PCL-NCO and 8PCL-SH compared to Dermabond®, * indicates p<0.05. Data were determined by histologic assessment of in vivo biocompatibility on day 14 after the surgery.

8PCL-NHS, 8PCL-NCO and 8PCL-CHO induced less inflammation (p<0.05) than Dermabond® as assessed by the thickness of inflammation on days 4. And no significant difference was observed between the thickness of inflammation induced by 8PCL-NHS, 8PCL-NCO and 8PCL-CHO, as shown by FIG. 10.

Example 5

Ex-Vivo Adhesion Strength

The ex vivo adhesion strengths of 8PCL-CHO, 8PCL-NCO and 8PCL-SH were tested using following method. Two cut pieces of rat skin were glued together at the cut edges by the polymers. A force was applied parallel to the rat skin at a moving speed of 10 mm/s (FIG. 4A), until the connection between the pieces of skin broke. Two commercially available tissue adhesives, TISSEEL® (a commercial fibrin adhesive) and Dermabond® (a commercial cyanoacrylate adhesive), were used for comparison. The inventors used skin from 10 different rats, and the test was repeated 4 times for each type of glue.

The 8PCL-CHO and 8PCL-NCO showed adhesion strengths (10.6N $cm^{-2}$ and 10.5N $cm^{-2}$) comparable ($p>0.05$) to that of 8PCL-NHS (11.2N $cm^{-2}$), suggesting that CHO and NCO groups could form covalent bonds with tissues as did NHS groups. 8PCL-SH had a lower adhesion force (4.6N $cm^{-2}$, $p<0.05$ compared to the 8PCL-NHS), possibly due to not enough bond formation; it was therefore not used in downstream studies. These results implied that the presence of functional groups, which were capable of forming covalent bonds with tissues, was crucial for adhesive strength.

While the present invention has been particularly described, persons skilled in the art will appreciate that many variations and modifications can be made. Therefore, the invention is not to be construed as restricted to the particularly described embodiments, and the scope and concept of the invention will be more readily understood by reference to the claims, which follow.

The invention claimed is:

1. A branched polymer comprising a plurality of biodegradable arms, wherein:
    said plurality of arms is at least 4 arms and each of said plurality of arms comprises a tissue-binding group;
    each of said plurality of biodegradable arms is a polyester;
    a total number of repeating units of said polyester in the branched polymer is between 70 and 180;
    the melting point of said branched polymer is in the range from 42 to 50° C.;
    the branched polymer is a tissue sealant characterized by tissue adhesion strength of more than 0.5N;
    the elastic modulus of said branched polymer is in the range from 10 to 200 kPa.

2. The branched polymer of claim 1, wherein said branched polymer comprises at least one terminating segment comprising said tissue-binding group.

3. The branched polymer of claim 1, wherein said branched polymer is selected from the group consisting of: star polymers, dendrimers, and hyperbranched polymers.

4. The branched polymer of claim 1, wherein said polyester is selected from the group consisting of: a polycaprolactone, poly-ε-caprolactone (PCL), a polyglycolide (PGA), a polylactide, poly-l-lactide (PLLA), poly-d,l-lactide (PLA), a polyhydroxybutyrate, a polyhydroxyvalerate and any combination or a copolymer thereof.

5. The branched polymer of claim 1, further comprising an additive.

6. The branched polymer of claim 1, wherein said tissue-binding group is selected from the group consisting of: an activated ester, a carboxylic acid, an acyl halide, a chloroformate, an anhydride, an aldehyde, an epoxide, an isocyanate, an isothiocyanate, a maleimide, a carbonate, a sulfonyl chloride, a haloacetamide, an acyl azide, an imidoester, a carbodiimide, a vinyl sulfone, a thiol, ortho-pyridyl-disulfide and any combination thereof.

7. The branched polymer of claim 6, wherein said tissue-binding group is N-hydroxy succinimide (NHS) and the biodegradable polymer comprises PCL.

8. The branched polymer of claim 1, comprising any one of 4-8-armed PCL, 4-8-armed PLA and 4-8-armed PGA including any combination or any co-polymer thereof.

9. The branched polymer of claim 8, having an average molecular weight ranging from 9000 Da to 21,000 Da.

10. The branched polymer of claim 1, further comprising a cross linking agent.

11. A method for adhering or sealing a biological surface, comprising providing the composition of claim 1 under conditions suitable for melting the composition, and contacting the biological surface with the molten composition, thereby adhering or sealing the biological surface.

12. The method of claim 11, wherein said composition comprises a branched polymer selected from the group consisting of 8-armed PCL-CHO, 8-armed PCL-NCO, 8-armed PCL-NHS, and 4-armed PEG-PLA-NHS and combination thereof.

13. The method of claim 11, wherein said conditions suitable for melting is at a temperature of not more than 5° C. above the melting point of the composition.

14. The method of claim 11, wherein said contacting is at a temperature in a range from 37 to 70° C.

15. A kit, comprising: (i) the branched polymer of claim 1; and (ii) a cross-linking agent.

* * * * *